(12) United States Patent
Garcia-Luna-Aceves et al.

(10) Patent No.: US 7,002,910 B2
(45) Date of Patent: Feb. 21, 2006

(54) RECEIVER-INITIATED CHANNEL-HOPPING (RICH) METHOD FOR WIRELESS COMMUNICATION NETWORKS

(75) Inventors: Jose Joaquin Garcia-Luna-Aceves, San Mateo, CA (US); Asimakis Tzamaloukas, Sunnyvale, CA (US)

(73) Assignee: The Regents of the University of California, Oakland, CA (US)

( * ) Notice: Subject to any disclaimer, the term of this patent is extended or adjusted under 35 U.S.C. 154(b) by 885 days.

(21) Appl. No.: 10/021,289

(22) Filed: Oct. 29, 2001

(65) Prior Publication Data

US 2002/0141479 A1    Oct. 3, 2002

Related U.S. Application Data

(60) Provisional application No. 60/244,420, filed on Oct. 30, 2000.

(51) Int. Cl.
*H04Q 7/00* (2006.01)
(52) U.S. Cl. .................. 370/229; 370/330; 370/335; 370/342; 375/132; 375/138; 375/145; 375/149; 455/436
(58) Field of Classification Search ............... 370/329, 370/330, 335, 342, 343, 346, 229; 375/130, 375/132, 134, 138, 146, 147, 145, 149; 455/436, 455/437, 438, 453
See application file for complete search history.

(56) References Cited

U.S. PATENT DOCUMENTS

| 5,381,443 | A  | * | 1/1995 | Borth et al. ............... | 375/134 |
| 6,311,204 | B1 | * | 10/2001 | Mills ....................... | 718/100 |
| 6,470,042 | B1 | * | 10/2002 | Tani et al. ................ | 375/132 |
| 6,590,928 | B1 | * | 7/2003 | Haartsen ................... | 375/134 |
| 6,606,341 | B1 | * | 8/2003 | Kanterakis et al. ......... | 375/130 |

* cited by examiner

*Primary Examiner*—Dang Ton
*Assistant Examiner*—Shick Hom
(74) *Attorney, Agent, or Firm*—John P. O'Banion

(57) ABSTRACT

A family of medium-access (MAC) collision-avoidance receiver-initiated channel-hopping (RICH) protocols which do not rely on carrier-sensing, or unique codes to each node within the network. The RICH protocol requires that each network nodes adhere to a common channel-hopping sequence, and that nodes that are not in a state of sending or receiving data will listen on the common channel hop. To send data nodes enter into a receiver-initiated dialogue over the channel-hop at the time at which a data transmission is needed. Nodes which succeed in performing the collision-avoidance handshake remain in the same channel-hop for the remainder of the data transfer, while the remaining nodes continue with the common channel hopping sequence. The described RICH protocols are capable of providing collision-free operation even in the presence of hidden terminals.

12 Claims, 20 Drawing Sheets

| time\hop | t1 | t2 | t3 | t4 | t5 | t6 | t7 | t8 | t9 | t10 | t11 | t12 | t13 |
|---|---|---|---|---|---|---|---|---|---|---|---|---|---|
| h1 | x->y RTR | | | | y->x | DATA | | | x->y ACK | | | | |
| h2 | | z->w RTR | w->z CTS | | | | z->w | DATA | | | w->z ACK | | |
| h3 | | | a->b RTR | silence | | | | | | | | | |
| h4 | | | | c<->d RTR backoff | | | | | | | | | |
| h5 | | | | | | | | | | | | | |

FIG. 1

| time\hop | t1 | t2 | t3 | t4 | t5 | t6 | t7 | t8 | t9 | t10 | t11 | t12 | t13 |
|---|---|---|---|---|---|---|---|---|---|---|---|---|---|
| h1 | x->y RTR | | | | | | | | | | | | |
| h2 | | x->y RTR | | | | | | | | | | | |
| h3 | | | y->x DATA | | y->x DATA | | | | | | | | |
| h4 | | y->x DATA | | c<->d RTR | | z->w DATA | z->w DATA | | z->w DATA | | | | |
| h5 | | | a->b RTR | z->w DATA | z->w DATA | | | y->x DATA | | | | | |
| h6 | | | w->z CTS | z->w DATA | | y->x DATA | | | | | | | |
| h7 | | | | | | | y->x DATA | z->w DATA | | | | | |
| h8 | | | | | | | | | x->y ACK | | w->z ACK | | |
| h9 | | | | | | | | | | z->w DATA | | | |

FIG. 3

| time\hop | t1 | t2 | t3 | t4 | t5 | t6 | t7 | t8 | t9 | t10 | t11 | t12 | t13 | t14 | t15 | t16 | t17 |
|---|---|---|---|---|---|---|---|---|---|---|---|---|---|---|---|---|---|
| h1 | x->y RTR | | | | y->x DATA | | | | x->y ACK | | | | x->y DATA | | | | y->x ACK |
| h2 | | z->w RTR | w->z CTS | | | | z->w DATA | | | | w->z ACK | | | | | | |
| h3 | | | a->b RTR | silence | | | | | | | | | | | | | |
| h4 | | | | c<->d RTR | backoff | | | | | | | | | | | | |
| h5 | | | | | | | | | | | | | | | | | |

FIG. 5

RECEIVER-INITIATED CHANNEL-HOPPING (RICH) METHOD FOR WIRELESS COMMUNICATION NETWORKS

CROSS-REFERENCE TO RELATED APPLICATIONS

This application claims priority from U.S. provisional application Ser. No. 60/244,420 filed on Oct. 30, 2000, incorporated herein by reference.

STATEMENT REGARDING FEDERALLY SPONSORED RESEARCH OR DEVELOPMENT

This invention was made with Government support under Grant No. F30602-97-2-0338 awarded by the Air Force Office of Scientific Research (AFOSR). The Government has certain rights in this invention.

REFERENCE TO A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The invention pertains generally to medium-access collision-avoidance protocols, and more specifically to a receiver-initiated channel-hopping protocol which does not require carrier-sensing or code assignments by the network nodes.

2. Description of the Background Art

Medium-access control (MAC) protocols based on collision avoidance have recently received considerable attention due largely to their simplicity when utilized within wireless LANs and ad-hoc networks. In a traditional collision-avoidance protocol, a node that has data to be transmitted to a receiver, first sends a request-to-send (RTS) control packet to the receiver, to which the receiver responds with a clear-to-send (CTS) control packet if it has correctly received the RTS control packet. It will be appreciated that the sender may only transmit a data packet after successfully receiving the CTS control packet. A number of variations of this method have been developed since the proposal of split-channel reservation multiple access SRMA, which include MACA, MACAW, IEEE 802.11, and FAMA. Industry researchers have relied upon sensing the channel before sending their RTS packets, within single channel networks, to avoid data packet collisions with other packets at the intended receivers. More recently, receiver-initiated collision-avoidance protocols have also been proposed for single-channel networks, in which the receiver initiates the collision-avoidance handshake. It will be appreciated that these receiver-initiated collision-avoidance protocols also require carrier-sensing to ensure correct collision avoidance.

Requiring collision-avoidance MAC protocols on single-channel networks to sense the channel as an integral part of the collision-avoidance handshake generally limits their applicability. For example, some commercial radios do not provide true carrier-sensing, and direct sequence spread-spectrum (DSSS) radios may capture only one of multiple overlapping transmissions in a non-deterministic manner, depending on the proximity and transmission power of the sources. Even if frequency-hopping spread-spectrum (FHSS) radios are utilized, carrier-sensing adds to the complexity of the radio, which must already provide coarse time synchronization at the dwell-time level. However, the use of one or more busy-tones, to indicate when a receiver is busy, essentially requires a second transceiver, and is therefore not generally considered economically attractive.

Several proposed MAC protocols were directed at taking advantage of spreading codes to provide multiple access. These MAC protocols have been variously analyzed, such as analyzing spreading-code protocols that are sender, receiver, or sender-receiver based wherein codes are assigned to senders, receivers, or combinations thereof. The use of carrier-sensing can improve the efficiency of the network by reducing the number of unsuccessful transmissions and the amount of unwanted interference, when utilized within a receiver-based asynchronous transmission protocol. Other protocols such as a receiver-based handshake protocol for CDMA (code division multiple access) networks have been proposed. Proposals that have been put forth to implement correct collision-avoidance in multihop wireless networks, without requiring nodes to use carrier-sensing, which rely on the use of code assignments to senders, or to receivers, for eliminating the need to use carrier-sensing.

A primary limitation of protocols based on code assignments arises from the way in which senders and receivers are required to determine the codes that each other are utilizing as a pre-condition of communication. A currently-available commercial DSSS radio typically requires about eleven integrated circuits per bit, and as a result CDMA is not an attractive option. Future DSSS radios are expected to utilize about fifteen integrated circuits, thereby allowing two different systems to operate over the same DS frequency channels as were defined in IEEE 802.11, however, up to twenty six FHSS radios can be collocated. According to the FCC regulations, up to fifteen FHSS radios can be collocated with minimum interference problems. It will be appreciated, therefore, that in ad-hoc networks implemented utilizing commercial radios operating within ISM bands, that the use of code assignments does not guarantee that receivers can capture one of multiple simultaneous transmissions, and that slow frequency hopping with one or more packets sent per hop is the viable way to achieve multiple orthogonal channels in the ISM bands.

It will be appreciated, therefore, that current medium-access control (MAC) protocols for wireless networks are based on collision-avoidance handshakes between sender and receiver which either require carrier-sensing or the assignment of unique codes to nodes to ensure that intended receivers hear data packets without interference from hidden sources.

Therefore, a need exists for a MAC protocol that can take advantage of the characteristics of FHSS radios operating in ISM bands while assuring that transmissions are free of collisions due to hidden terminal interference. The present invention satisfies those needs, as well as others, and overcomes the deficiencies of previously developed MAC protocols.

BRIEF SUMMARY OF THE INVENTION

The present invention comprises a family of multiple channel medium access protocols for use in ad-hoc networks to eliminate hidden-terminal interference without resorting to the use of carrier-sensing or code assignments within the network. This family of collision-avoidance MAC protocols according to the present invention are referred to as receiver-initiated channel-hopping (RICH) protocols.

These protocols provide receiver-initiated MAC protocols in which the direction of the collision avoidance handshakes may be considered to be reversed from traditional protocols. Collision avoidance and throughput which results from the use of the RICH protocols is verified analytically and through simulations which further have a predictive value for the operation of the RICH protocols under realistic scenarios and conditions. RICH protocols are generally applicable to ad-hoc networks based on commercial off-the-shelf frequency hopping radios operating in unlicensed frequency bands. Based on the described analysis and simulation results, it appears that the present invention should outperform the current forms of sender-initiated contention-based MAC protocols.

All nodes in a network, according to the RICH protocols, are required to follow a common channel-hopping sequence, wherein a channel may be defined as a frequency hop, a spreading code, or a combination of both. However, with commercial radios operating in ISM bands, a channel should be viewed as a frequency hop, or a hopping sequence. All nodes that are not sending or receiving data, at a given time, listen on the common channel hop. To send data, nodes engage in a receiver-initiated dialogue over the channel-hop in which they find themselves at the time they acquire data to be sent. Nodes whose collision-avoidance handshake succeeds can remain in the same channel hop for the duration of their data transfer, while the remaining nodes that are not subject to receiving or transmitting data, continue to follow the common channel hopping sequence. Two variations of the RICH protocols are described herein which include a method based on simple polling and one which utilizes dual-polling which is a more complex form of polling to enhance efficiency. In RICH-SP (simple polling), the receiver polls the sender for data packets. In RICH-DP (dual poll), both the polling nodes and polled nodes can transmit data after a successful handshake. Analyzing the RICH protocols, in the absence of fading, it is shown that these protocols solve the hidden-terminal problem, whereas they can eliminate data packet collisions without the need for carrier-sensing or code assignments. The performance of the RICH protocols is compared with the MACA-CT protocol, which utilizes MACA collision-avoidance handshakes over a common channel and an assigned transmitter-oriented data channel to avoid collisions of data packets. Delays for RICH-SP as well as RICH-DP are calculated, and the results of simulation experiments are presented to illustrate the performance of RICH protocols in realistic scenarios.

An object of the invention is to provide a wireless MAC protocol that insures proper collision-avoidance.

Another object of the invention is to provide a wireless MAC protocol in which carrier-sensing is not required.

Another object of the invention is to provide a wireless MAC protocol which does not require code assignments.

Another object of the invention is to provide a wireless MAC protocol that is capable of increasing communication throughput within the network.

Another object of the invention is to provide a wireless MAC protocol that is capable of operating with reduced delay characteristics.

Another object of the invention is to provide a wireless MAC protocol in which a common frequency-hopping sequence is exploited to assure collision-free communication.

Another object of the invention is to provide a wireless MAC protocol in which the limitation on the minimum dwell time per hop is responsive to the time required to execute a handshake.

Another object of the invention is to provide a wireless MAC protocol that minimizes the control packet overhead within the network.

Another object of the invention is to provide a wireless MAC protocol that supports dual-purpose polling packets, wherein a polling node can indicate with a single control packet that it is ready to send, and ready to receive, data from the polled node.

Another object of the invention is to provide a wireless MAC protocol that supports disbursing the transmission of data packets across multiple frequency channels.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is a timing diagram exemplifying a communication between nodes within the wireless network according to a simple-polling aspect of the present invention, showing four handshaking cases.

FIG. 3 is a timing diagram exemplifying a communication between nodes within the wireless network according to a simple-polling aspect of the present invention, showing data packets transmitted over multiple frequency channels.

FIG. 5 is a timing diagram exemplifying communication within the wireless network according to a dual-polling aspect of the present invention, showing data packets transmitted in both directions in response to a ready-to-receive control packet.

DETAILED DESCRIPTION OF THE INVENTION

Figure 2:
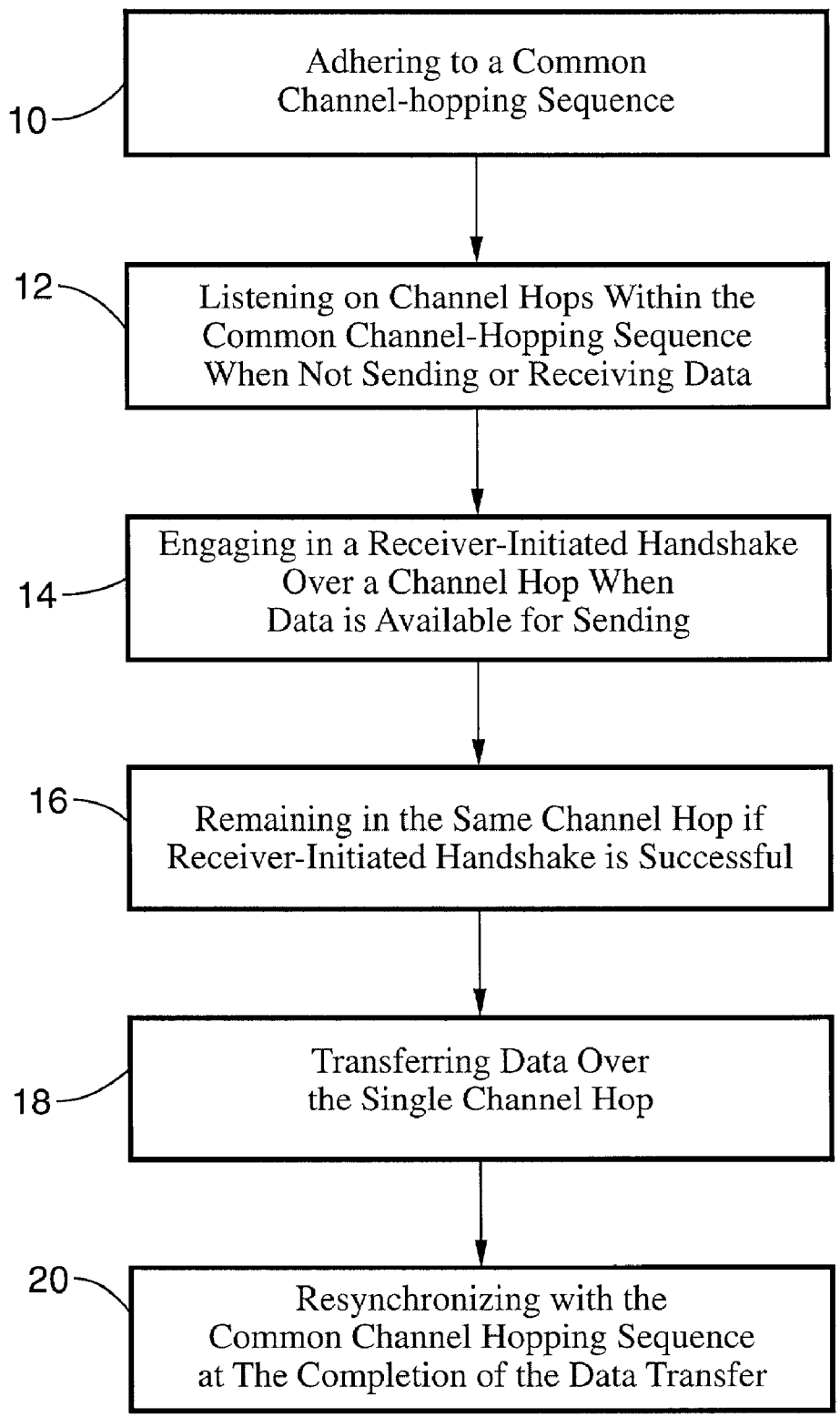
FIG. 2 is a flowchart of RICH protocol operation according to an aspect of the present invention, showing the execution of a data transfer within a single hop.

For illustrative purposes the present invention will be described with reference to FIG. 1 through FIG. 26. It will be appreciated that the apparatus may vary as to configuration and as to details of the parts, and that the method may vary as to the specific steps and sequence, without departing from the basic concepts as disclosed herein.

1. Receiver-Initiated Channel-Hopping (RICH) Protocols
   1.1. Basic Concepts in Channel Hopping The RICH protocols of the present invention described herein were developed in accord with three basic observations. First, it has been generally determined within the industry that reversing the collision-avoidance handshake, with a receiver-centric approach, can provide for collision-avoidance and improved network throughput. Second, the use of code assignments to eliminate hidden-terminal interference results in excessive overhead. Third, commercially available frequency-hopping radios typically operate in ISM bands, thereby requiring that the radios be temporally-synchronized so that all radios hop to different frequency hops at approximately the same time.

To eliminate hidden-terminal interference, the present methods of communicating data over a network as embodied in the RICH protocols exploit the fact that the channel hopping by the nodes in a frequency-hopping network must be synchronized. A common frequency-hopping sequence is therefore assumed by all the nodes, such as a common channel, so that nodes may listen on the same channel at the same time, unless instructed otherwise. Nodes execute receiver-initiated collision-avoidance handshakes to determine which sender-receiver pair should remain in the present hop, or an alternative hop sequence, in order to exchange data. The remaining nodes which are not engaged in data exchange continue hopping on the common hopping sequence. The collision-avoidance handshake ensures that the receiver of a successful handshake cannot receive packets that suffer from hidden-terminal interference, and since all nodes not able to exchange data must hop to the next frequency hop, RICH eliminates the need for carrier-sensing and code assignment by simply allowing the sender and receiver of the handshake to remain on the same frequency hop in which they succeeded in their handshake.

The dwell time for a frequency hop in the RICH protocols need only be of sufficient duration for executing a handshake. It will be appreciated that this period of time should be sufficient to allow for the transmission of a pair of MAC addresses, a CRC, and framing information. An upper bound to the time spent in any one hop may be found from applicable FCC regulations, which limit the time a frequency-hop radio can remain in the same hop to a maximum of four hundred milliseconds (400 mS). At a data rate of 1 Mbps, the four hundred millisecond hop time limit provides ample time for transmitting entire data packets and packet trains. Hence, RICH protocols can be implemented by allowing a sender-receiver pair to communicate in the same frequency hop for a period of time that must be the smaller of four hundred milliseconds and the time elapsed before the same frequency hop is used again in the common hopping sequence. Alternatively, a few orthogonal frequency-hopping sequences can be defined, for each frequency hop of the common hopping sequence. For example, approximately ten sequences can be defined, which is smaller than the number of simultaneous orthogonal frequency hops around a receiver in the 2.4 GHz band.

1.2. RICH-SP

RICH-SP is a RICH protocol based on the use of simple polling by the receiver. The concept of simple polling was first introduced in MACA-BI for single-channel networks and was modified in RIMA to provide collision avoidance over single-channel networks.

In one aspect of the present invention, all the nodes under the RICH-SP protocol follow a common channel-hopping sequence wherein the duration of each hop is sufficient to allow nodes to receive a collision-avoidance control packet from a neighbor. A node attempts to poll its neighbors at a rate that is a function of the data rate with which it receives data to be sent, as well as the rate with which the node hears its neighbors send control and data packets. To poll any of its neighbors a node sends a ready-to-receive (RTR) control packet over the current channel hop specifying the address of the intended sender and the address of the polling node. If the RTR is received successfully by the polled node, that node starts sending data to the polling node immediately and over the same channel hop, while all remaining nodes hop to the next channel hop in the common channel hopping sequence. In practice, the dwell time of a channel hop is only required to be of sufficient duration to allow a transmitted RTR control packet to be received by a polled node. When the transmission of data is complete, the sender and receiver involved in the communication re-synchronize themselves with the current channel hop. If either multiple RTR packets are sent during the same channel hop, or the polled node has no data to send to the polling node, the polling node does not receive any data within a round-trip time after sending its RTR and must rejoin the rest of the network at the current channel hop. To permit the polling node to determine quickly that no data packet is to be expected, the polled node can transmit a short preamble packet in front of the data packet. To simplify the following description it is assumed that a node is able to detect that no data packet is being received.

FIG. 1 illustrates the operation of RICH-SP for the case in which sender-receiver pairs exchange data over a single frequency hop. The channel hopping sequence in the figure is shown utilizing sequential hopping amidst five hops (channels), wherein all nodes start at time $t_1$ from hop h1. At time $t_2$ the system is at hop h2 and so forth. The example within the figure illustrates that at time $t_1$ node x sends an RTR control packet to node y, in response to which node y exchanges data over the same channel. Notice that, there is a probability of $$\frac{1}{N-1}$$

that node y has data for x. While nodes x and y stay in h1 until y has finished sending its data, all the other nodes hop to h2 according to the common channel hopping sequence. At time $t_2$ another node z sends an RTR control packet to node w, however node w does not have a data packet for z, therefore node w sends a CTS control packet to enable node z to send data to node w. Accordingly, at time $t_4$ node z commences transferring data to node w. Again, node z and node w stay in hop h2 until node z completes the data transfer, while the remaining nodes hop to hop h3. At time $t_3$, node a sends an RTR control packet to node b when node b is busy transmitting data to another node, assuming the use of unidirectional radios. Node b does not receive the RTR control packet, therefore silence occurs at time $t_4$. In this case, node a continues to hop with the other nodes to hop h4. Nodes c and d are shown simultaneously transmitting an RTR control packet at time $t_4$ which results in a collision, and both nodes are required to back off. At a predetermined time after backing off, the node may again attempt to send an RTR control packet to execute a handshake.

After a node is properly initialized, it transitions to the PASSIVE state. Prior to transmitting anything on the channel, every node must first listen to the channel for a period of time equal to a minimum of the dwell time, wherein dwell time is defined as the amount of time spent within a single hop. If node x is in PASSIVE state and obtains an outgoing packet to send to neighbor z, it transitions to the RTR state and sends an RTR packet with the destination address of the node that is the target destination, in this case z.

If node z receives the RTR control packet correctly and has data for x, node z transitions to the XMIT state, wherein it transmits a data packet to x in the same frequency hop. If node z, however, cannot decode the RTR control packet correctly, such as due to the reception of noise or silence it continues to hop with the rest of the nodes in the common hopping sequence. After sending an RTR control packet, node x waits until the beginning of the next hop. If a preamble is not detected at this time, node x transitions to a new frequency channel according to the common hopping sequence. If a preamble, or an equivalent control or data packet, is received from the polled node then x remains in the same frequency channel until (a) either a data packet arrives containing a duration value, such as in the header; or (b) a "Clear To Send" (CTS) packet arrives allowing x to send a data packet at the same unique frequency channel.

FIG. 2 depicts the general flow of the RICH collision-avoidance method for a network in which the nodes are configured to remain at a single channel hop during the data exchange. It will be appreciated that all nodes within the network which operate according to the RICH protocol must adhere to a common channel-hopping sequence as shown in block 10. Channels listen during the hops of the common channel-hopping sequence when they are not exchanging data as per block 12. Handshaking is initiated by receivers during a channel hop, and if data is available from a polled sender according to block 14, then upon a successful handshake the sender and receiver may remain in the same channel hop as per block 16, and exchange data between the polling node and the polled node as shown in block 18. After data has been exchanged, the nodes that remained in the single hop to exchange data then resynchronize themselves with the common channel hopping sequence as depicted by block 20. It will be appreciated that the data exchange may occur in either direction, from polled node to polling node, if the polled node has data available for the polling node; or alternatively from polling node to polled node if the polling node has data available which is subject to additional handshaking constraints.

Technically, up to four hundred milliseconds (400 mS) is allowed per dwell time in adherence with FCC regulations, however, this would provide an excessively long hop-time for transmitting data within the ISM bands. It may be desirable, therefore, to allow nodes exchanging data to continue hopping, such as in a multifrequency mode, according to a different (second) hopping sequence, because staying at the same frequency hop for an extended period of time negates many of the inherent advantages that may be accrued from frequency hopping. For example, frequency hopping can continue to work efficiently even in the presence of narrow-band jamming, it provides resilience against fading and erasures, and it minimizes multipath propagation problems. It will be appreciated, therefore, that a predetermined minimum hopping rate should be adhered to for any given application.

In order to retain the advantages of frequency hopping while avoiding the need for code assignments, a second hopping sequence is defined in which freedom from interference from other data transmissions is guaranteed for at least a few dwell times, such as up to the time at which the same frequency hop is revisited within the common hopping sequence being utilized for handshakes. Although determination of a second channel hopping sequence may be performed in a number of ways, it is preferred that the destination node determine and embed hopping information within the CTS control packet. The information embedded within the CTS control packet is thereby sent back to the source from the destination and is utilized by the sender to discover the unique hopping pattern to be used for exchanging data. It will be appreciated that the base frequency of the destination is preferably incorporated within the CTS control packet to aid sender discovery of the hopping pattern. Notice that sending data in this way requires the use of packet trains consisting of packets with lengths equal to a size which can be accommodated in a single hop.

FIG. 3 exemplifies RICH-SP operation within the described multiple frequency channel situation, and is shown providing only eight different frequencies, wherein the transmission of each data is constrained to a maximum of seven slots. At the beginning each of the nodes is at frequency h1. Node x sends an RTR control packet to node y, with base frequency h5. At slot t2, node y has received the RTR control packet in the clear from x and starts sending a data packet back to node x. By way of example, the collision-free hopping sequence that x and y follow until the data has been exchanged is: h5, h3, h8, h2, h6, h7, h4. In the same figure, node z sends an RTR control packet to node w at time t2. Node w moves to the receiving frequency channel for node z and responds with a CTS control packet, which is indicative of no data being available for node z. At time t4, node z sends data to node w. In the previous time slot, at time t3, node a has commenced to send an RTR control packet to node b while b is busy transmitting data to some other node, therefore, no data is exchanged and the common hopping sequence continues for nodes a and b. Another set of nodes c and d are shown at time $t_4$ simultaneously sending RTR control packets which collide with one another.

If a collision takes place, such as resulting from multiple RTR control packets being transmitted by nodes within a one-way propagation delay, the nodes involved must transition to a BACKOFF state and try again to perform a handshake at a later time, such as one selected at random. After sending an RTR control packet, node x waits for a response in the new frequency base. If node x determines that its RTR control packet was not received correctly by z after a time period equal to one hop, it preferably resynchronizes itself with the other nodes, such as may be easily determined from initialization information received at the beginning of the hop cycle.

To reduce the probability that the same nodes repeatedly compete for the same receiver at the time of the next RTR control packet, each of the RTR control packets specify a back-off-period unit to be utilized in the case of a contention. The nodes that must enter the BACKOFF state compute a random time that is a multiple of the back-off period unit advertised in the RTR control packet. The simplest case consists of computing a random number of back-off-period units using a uniformly distributed random variable from 1 to d, where d is the maximum number of neighbors for a given receiver. A simple back-off-period unit may comprise the time required to send a small data packet successfully.

Figure 4:
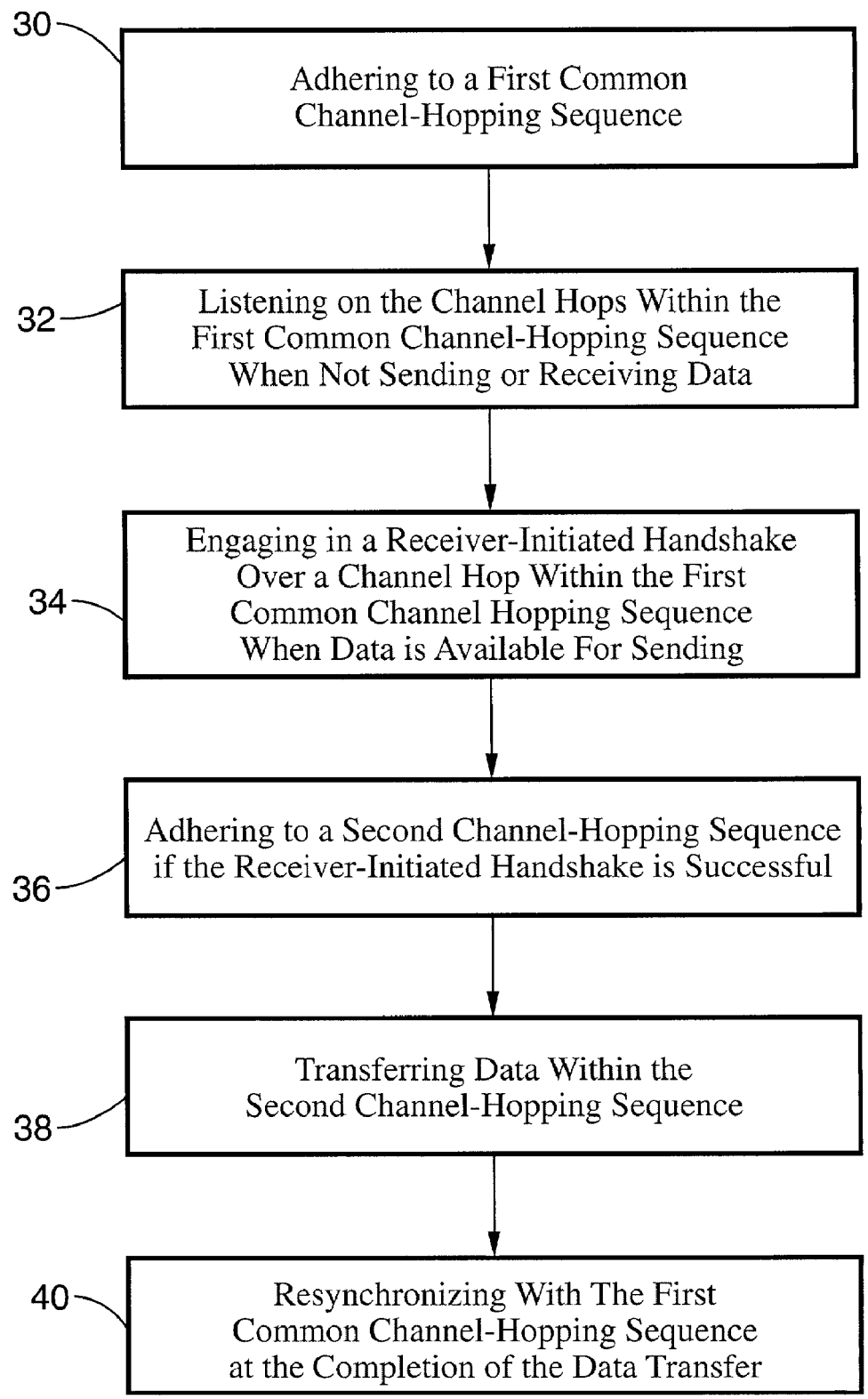
FIG. 4 is a flowchart of RICH protocol operation according to an aspect of the present invention, showing the execution of a data transfer within hops of a separate channel hopping sequence.
Figure 6:
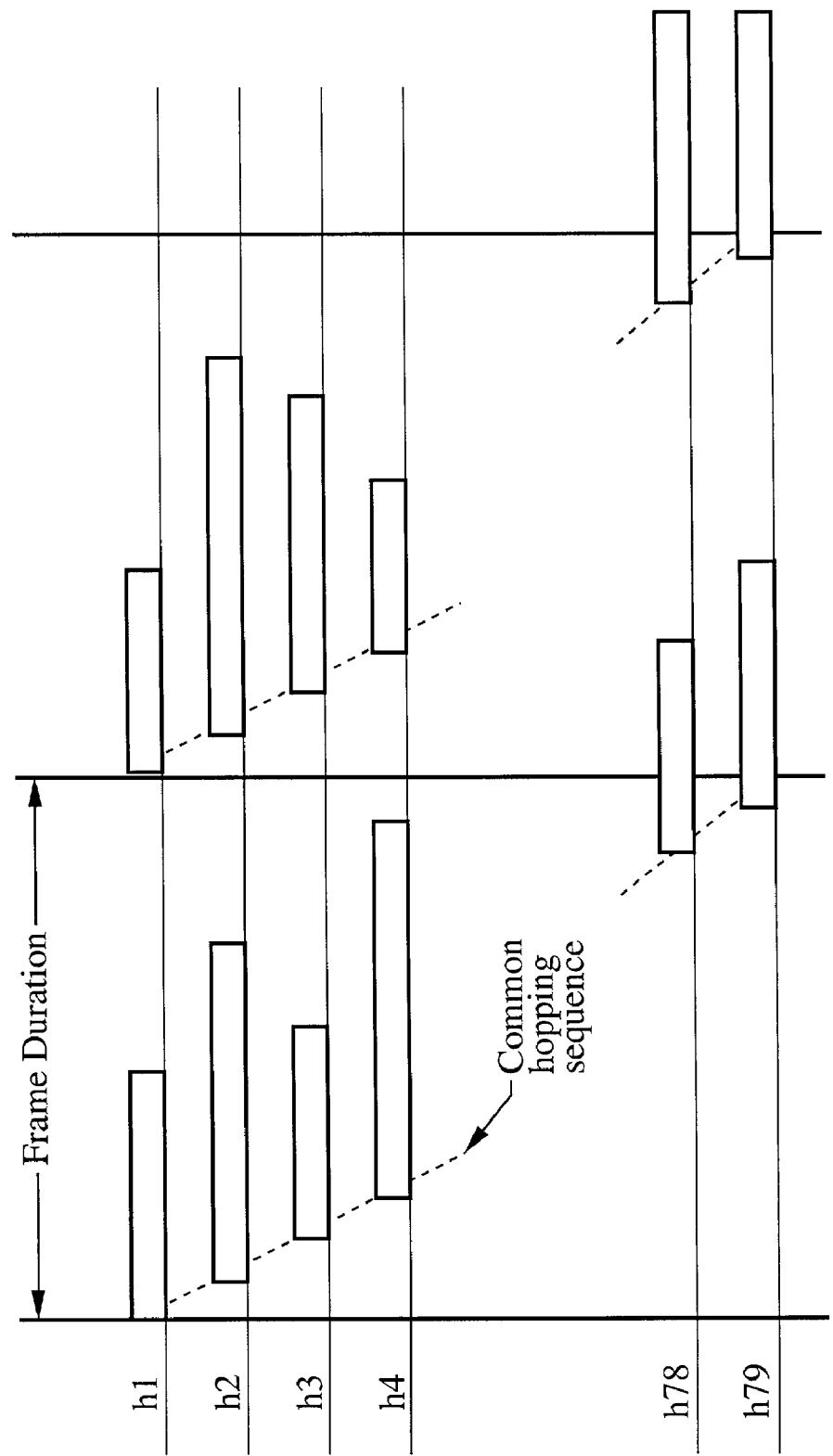
FIG. 6 is a timing diagram of floor acquisition according to an embodiment of the present invention, showing frame durations across multiple hops within the spread-spectrum.

FIG. 4 depicts the general flow of the RICH collision-avoidance method for a network in which the nodes are configured to utilize multiple frequency hops during the data exchange. It will be appreciated that all nodes within the network which operate according to the RICH protocol must adhere to a common channel-hopping sequence as shown in block 30, and that channels listen when they are not exchanging data as per block 32. Handshaking is initiated by receivers during a channel hop, and if data is available according to block 34, then upon a successful handshake the sender and receiver embark on a second channel-hopping sequence as per block 36, wherein data is exchanged between the polling node and the polled node as shown in block 38. After data has been exchanged, the nodes which have exchanged data within hops of the second channel hopping sequence commence to resynchronize themselves to the common channel hopping sequence as shown in block 40. Again, it should be appreciated that the data exchange between the nodes may occur in either direction, from polled node to polling node, if the polled node has data available for the polling node; or alternatively from polling node to polled node if the polling node has data available which is subject to additional handshaking constraints.

1.3. RICH-DP

An improvement to the described collision avoidance strategy RICH-SP may be provided by increasing the probability that a data exchange will result from a successful RTR control packet handshake, without violating the rule that data packets should be transmitted only if they are addressed to the polling nodes. A simple way to achieve this is to make an RTR control packet entry both a request for data from the polled node, and a transmission request for the polling node to send data, is available. The RICH-DP (receiver-initiated code hopping with dual-purpose polling) protocol does exactly this.

FIG. 5 illustrates the modified collision avoidance handshake to permit the polling node to either receive or send data without collisions for the case in which a pair of nodes exchanges data over the same frequency hop upon which their collision avoidance handshake succeeded. A key benefit of the dual-use polling in RICH-DP is that both polling and polled nodes can exchange data while collision avoidance is assured.

RICH-DP preferably yields transmission priority to the polled node. When a node z is polled by, and has data for, node x it sends a data packet. After the data packet is exchanged from node z, node x sends a data packet back to node z. However, if the polled node does not have any data for node x, it immediately sends a "Clear-To-Send" (CTS) control packet to node x. As was the case with RICH-SP, the lengths of RTR control packets and CTS control packets are preferably identical and set approximately equal to the one hop duration.

All the nodes in RICH-DP, as in RICH-SP, are synchronized at the beginning of every hop cycle and follow the same hop pattern until a successful handshake is executed between a pair of nodes. The pair of nodes then remains on the same hop channel, or follows an identical second hop channel sequence, for the duration of the data exchange which must terminate prior to the reuse of the same frequency hops within the common hopping sequence.

In RICH-DP, after the polled node finishes sending data to the receiver, it should stay in the same established frequency channel, or according to the second hopping sequence, for at least one more hop to allow for sensing if the receiver wishes to continue in the same busy period with more data. The RTS control packet should always be sent in the clear, because it has been assumed that a perfect channel is provided and that the hopping sequence given between a pair of nodes to send data does not collide at any time with any other hopping sequence.

It will be appreciated that the bidirectional features according to RICH-DP are generally described by the flowcharts of FIG. 2 and FIG. 4, wherein the transfer of data can comprise transmissions which occur in either direction or in both directions.

2. Correct Collision Avoidance in Rich Protocols

The following theorems, Theorem 1 and Theorem 2, illustrate that RICH-SP and RICH-DP ensure that there are no collisions between data packets and any other transmissions under the following assumptions:

(a) A node transmits an RTR control packet that does not collide with any other transmissions according to a non-zero probability.

Maximum end-to-end propagation time in the channel is $\tau < \infty$.

(c) A packet sent over the channel that does not collide with other transmissions is delivered error free according to the destination according to a non-zero probability.

(d) All nodes execute the RICH protocol correctly.

(e) Transmission time of an RTR control packet and a CTS control packet is given by $\gamma$, the transmission time of a data packet is $\delta$, the hardware transmit-to-receive transition time is zero, while $2\tau < \gamma \leq \delta < \infty$.

(f) Dwell time in each hop is equal to the time needed to transmit an RTR, or CTS, plus the maximum end-to-end propagation time.

(g) No capture or fading occurs within the channel.

(h) Any overlap of packet transmissions at a particular receiver prevents the receiver from understanding any of the packets.

(i) Any frequency hopping pattern depends solely on the base frequency hop used and the probability that two or more distinct hopping sequences will collide is zero. It is assumed herein that data packets are exchanged over a single frequency hop, rather than over a hopping sequence.

The approach utilized for validating the RICH protocols must illustrate that the collision-avoidance protocol operates properly, such as preventing data packet collisions, and consists of illustrating that once a data packet is sent by a node, the intended receiver obtains the packet without interference from any other source. It will be appreciated that a pair of nodes can exchange data over a given hop $h_i$ while the other nodes continue on in the common hopping sequence or are exchanging data over a different hop.

Utilizing commercially available spread spectrum radios, periods of deep fading, often referred to as erasures, can occur which disrupt any type of collision avoidance dialogue, such as that which occurs when data packets experience collisions in the presence of fading. However, with frequency hopping radios, the higher the rate with which a radio hops from one frequency to another, the lower the probability that an erasure will occur. Even though fast frequency hopping would be ideal to avoid erasures, it is not commercially available. However, since the dwell time used in the RICH protocol need to include only two MAC addresses, a CRC, and framing bits, the anticipated effect of erasures under actual operating conditions should be negligible.

The assumption of zero processing delays and turnaround delays is made for the sake of convenience, however, the same type of proofs with adjusted parameters, apply for non-zero hardware delays.

Theorem 1:

RICH-SP provides correct collision avoidance in the presence of hidden terminals when the time spent exchanging data is shorter than the time elapsed before the same frequency hop is reused in the common hopping sequence.

Proof:

Consider a polling node A and a polled node X and assume that A sends an RTR control packet at time $t_0$. After sending its RTR control packet, node A remains in frequency hop H for a period of time that of sufficiently duration to assure detection of a CTS control packet or the presence or absence of a data packet. Denoted by h is the dwell time within a particular hop. If X does not receive the RTR control packet correctly due to interference from any neighbor hidden from A, it does not send any data. Otherwise, X receives the RTR control packet from A at time $t_1 = t_0 + h$ and remains on the same frequency hop H within which the RTR control packet was received. At time $t'_1 > t_0 + h$, if node X has a local data packet for A, then it starts transferring data to A; otherwise, X sends a CTS control packet to A enabling A to send its data packet. Both nodes A and X remain in frequency hop H, that never collides with the common hopping sequence since the assumption has been made that the time spent exchanging data is shorter elapsed-time required before the same frequency hop is reused in the common hopping sequence as shown by the graph of floor acquisition in FIG. 6.

Theorem 2:

RICH-DP provides correct collision avoidance in the presence of hidden terminals when the time spent exchanging data is shorter than the time elapsed before the same frequency hop is reused in the common hopping sequence.

Proof:

The proof of collision avoidance for RICH-DP is the same as in Theorem 1, because the time required for exchanging up to two packets with acknowledgements is presumed to be less than the time interval which occurs between the occurrence of the same frequency hop in the common hopping sequence.

3. Approximate Throughput Analysis

The objective of the following analysis is to calculate the throughput achieved for the various RICH protocols, and to compare them against sender or receiver-initiated CDMA protocols, namely, CT and MACA-CT. The protocols utilized for the analysis were chosen so as to provide a comparison between the performance of the RICH protocols against the best performing CDMA protocols reported to date for ad-hoc networks in which receivers can detect at most one transmission at a time.

The analysis provides a number of interesting results. By making collision-avoidance a joint effort by sender and receiver, as is done in RICH-DP, improvements in performance may be achieved over what may be achieved with RICH-SP. This result should be expected, in view of the fact that dual-use polling doubles the opportunity for the sending of collision-free data. Furthermore, even RICH-SP provides a performance improvement over MACA-CT, which in turn outperforms the CT protocol.

3.1. Assumptions

The throughput of receiver-initiated protocols is analyzed utilizing the model first introduced by Sousa and Silvester for CDMA protocols. Throughput and average delay for RICH protocols is calculated utilizing a discrete-time Markov chain, with the following assumptions being made:

(a) N nodes exist in the fully-connected network.

(b) A single unslotted channel is used for all packets, and the channel introduces no errors.

(c) Maximum of one RTR control packet can be successfully transmitted within a given time slot.

(d) Up to m pairs of nodes may simultaneously exchange data, due to the upper limit in the number of transmissions that may co-exist at the same time in an ISM radio band when using FHSS.

(e) All nodes can detect collisions perfectly, and no capture or fading occurs.

(f) The data packet length distribution is geometric according to parameter q; therefore, the probability of a data packet with length l is $P[L-l]=(1-q)q^{l-1}$ and the average packet length, measured in minipackets per slot, is, $$\overline{L} = \frac{1}{1-q}.$$

(g) The size for an RTR control packet and a CTS control packet plus a maximum end-to-end propagation is equal to h, where h is the dwell time in a particular hop; the size for a data packet is always a multiple of h.

A polled node has a packet addressed to the polling node with probability $$\frac{1}{N-1},$$

which is a uniform distribution. Furthermore, it is assumed that each node sends its RTR control packet according to a Poisson distribution with a mean rate of $$\frac{\lambda}{N-1}$$

and that, when applicable, the polling node chooses the recipient of the RTR control packet with equal probability.

3.2. RICH-SP

To provide a useful comparison with MACA-CT, the same average packet length L, is utilized for all protocols considered. However, since in MACA-CT a slot is equal to the size of an RTS control packet plus a CTS control packet plus the corresponding propagation time needed, the duration of a slot size, h, for RICH protocols is equal to half the size of the slots used in MACA-CT. Consequently, the average packet length for MACA-CT will be equal to $$\frac{1}{2(1-q)}.$$

At any given slot, a node can be: (a) idle, (b) transmitting an RTR control packet or a CTS control packet, and (c) sending segments of the data packet within a series of temporally consecutive slots. As we have described, the possible scenarios that can occur in RICH-SP under which node x sends an RTR control packet to node y, are generally given as follows:

(a) node y sends its data packet to x with probability $$\frac{1}{N-1};$$

(b) node y does not have any data for x, therefore y sends a CTS control packet to x, whereupon x sends its data to y;

(c) node y sends an RTR control packet at the same time as x, and a collision occurs; or (d) node y is already attuned to a different hopping pattern, therefore node x does not hear anything in the next hop.

Figure 7:
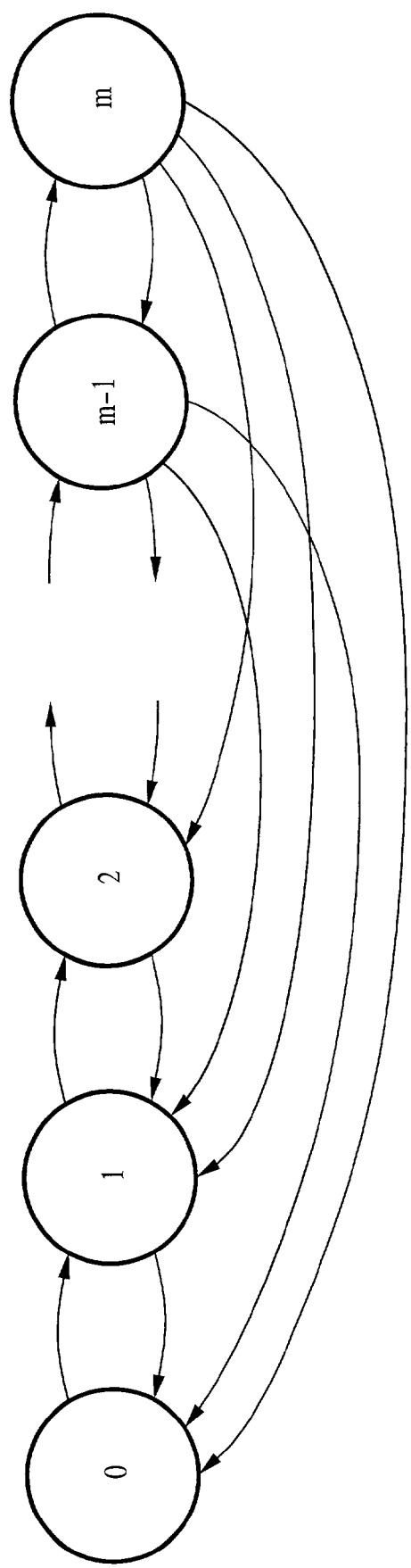
FIG. 7 is a state diagram illustrating a Markov-chain which defines the number of communicating pairs within an embodiment of the present invention.

FIG. 7 illustrates a number of communicating node pairs that at any given time may be utilized to describe the system state. Notice that, since all the nodes that transmit an RTR control packet which is not received at time slot t−1, are available at slot t such that the system state at any given time slot is independent of the number of nodes that send an unanswered RTR control packet. Accordingly, it is necessary to calculate the transition probabilities of this Markov chain under the assumptions presented above. A transition in the Markov chain from one state to another occurs when: (a) at least one member from the set of nodes exchanging data packets, has completed the transmission of data, and (b) the nodes that participate in the handshake either succeed or fail in sending an RTR control packet. To calculate the transition probability from the current state, the number of nodes that will complete sending data must be determined, along with the number of nodes that succeed or fail in sending an RTR control packet. The value B(n,p,k) is utilized within the following formula to represent a geometric distribution.

$$B(n, p, k) = \binom{n}{k} p^k (1-p)^{n-k} \tag{1}$$

Having made the assumption of geometrically distributed data packet lengths with parameter q, the probability that i pairs of nodes will become idle in any given time slot is equal to $$Pr\binom{i \text{ pairs}}{\text{become idle}} = \binom{m}{i}(1-q)^i q^{(m-1)} = B(m, 1-q, i) \tag{2}$$

Let $P_{k,l}$ be the transition probability in the Markov chain from state k, wherein k pairs of nodes are exchanging data, in slot t−1 to state l wherein l pair of nodes exchanges data, in slot t. This is conditioned on the number i of communicating pairs of nodes that finish sending or receiving data packets at the beginning of slot t. The system is at state 1 at time slot t−1 and therefore the number of nodes that are available to receive or transmit is equal to N−2(l−i). If the transition to state 1 is made, then let x' be the number of nodes which transmit an RTR control packet at the beginning of time slot t. Furthermore, l'=l−(k−i) pairs of nodes will become busy exchanging data packets and n'=x'−l' nodes will transmit an RTR control packet that will not be received. Due to the assumption that only one RTR control packet can be successful at a given time slot, a transition from state k to state l is possible only if m'=1, or m'=0.

The event upon which a transition from k to l occurs is denoted as $\Phi$. The occurrence of one transmission addressed to an idle node is denoted by $\Phi I$. The occurrence of exactly one transmission addressed to a busy node terminal is denoted by $\Phi B$. The transition probabilities are thereby calculated as follows:

$$P_{k,l} = \sum_{i=0}^{k} \binom{i \text{ pairs}}{\text{become idle}} \cdot [P[\Phi \cap \Phi I] + P[\Phi \cap \Phi B] + P[\Phi \cap (0 \text{ or} > 1 \text{ transmission})]]$$

$$= \sum_{i=0}^{k} B(k, 1-q, i) \cdot \left[\delta(m'-1)\delta(n')B(N', p, 1)\left(\frac{N'-1}{N-1}\right)\right]$$

$$= \delta(m')\delta(n'-1)\delta(n')B(N', p, 1)\left(\frac{N-N'}{N-1}\right) + \delta(m')(1-\delta(n'-1))B(N', p, n')$$

where B(n,p,k) is given from Eq. 1, wherein $\delta(0)=1$, $\delta(x)=0$ if $x \neq 0$. The above equations can be rewritten as follows:

$$p_{k,l} = q^{l-1}(1-q)^{k-1}\left\{\binom{k}{l-1}(1-q)p(1-q)^{M+1}\frac{M^2+3M+2}{N-1} - \binom{k}{l}qp(1-q)^{M+1}\frac{M^2-M}{N-1} + \binom{k}{l}q\right\}$$

where M=N−2l. To calculate the average throughput we need to know the steady-state probabilities that correspond to each one of the states of the Markov chain as shown in FIG. 7. Given the transition probability formula (Eq. 3) a linear system of equations can be solved with as many unknowns as the number of states in the Markov chain to calculate the steady-state probabilities. If $PS_l$ is the steady-state probability for state l, then the average throughput S is equal to the number of data packets transmitted at the same frequency hop, as stated in:

$$S = \sum_{l=0}^{N/2} l \cdot PS_l \qquad (5)$$

Figure 8:
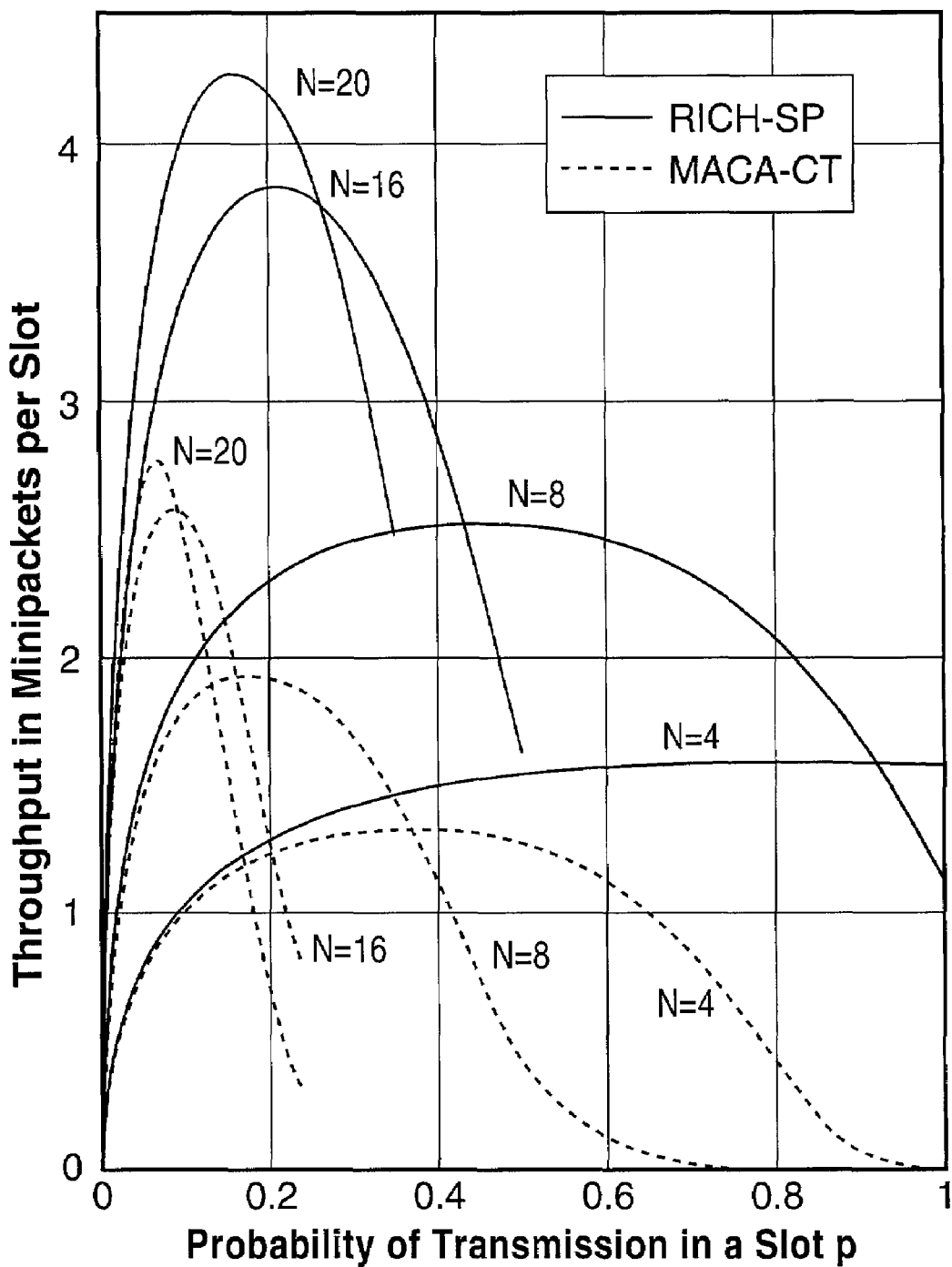
FIG. 8 is a graph of throughput and transmission probability in response to changing packet length for the RICH-SP protocol according to an embodiment of the present invention, shown in comparison with a conventional protocol.

FIG. 8 illustrates an example of the throughput achieved by RICH-SP and MACA-CT versus the probability of transmission p for various numbers of nodes in the network. As a consequence of the slot duration within RICH-SP being half that of MACA-CT, the probability of transmission at a given slot is given by $$\frac{p}{2}.$$

The maximum throughput of RICH-SP is found to always be higher than that of MACA-CT, which is anticipated since the time required to exchange control signals is half the size of the one used in MACA-CT and consequently the vulnerability period in RICH-SP is half the time spent in MACA-CT. Since no data is ever sent within RICH-SP to a busy terminal, the nodes in RICH-SP are immediately available to try again, the same cannot be said of the CT protocols. Therefore, for any given time slot, the number of nodes available to transmit an RTR control packet in RICH-SP is maximized while the contention period is minimized.

Figure 9:
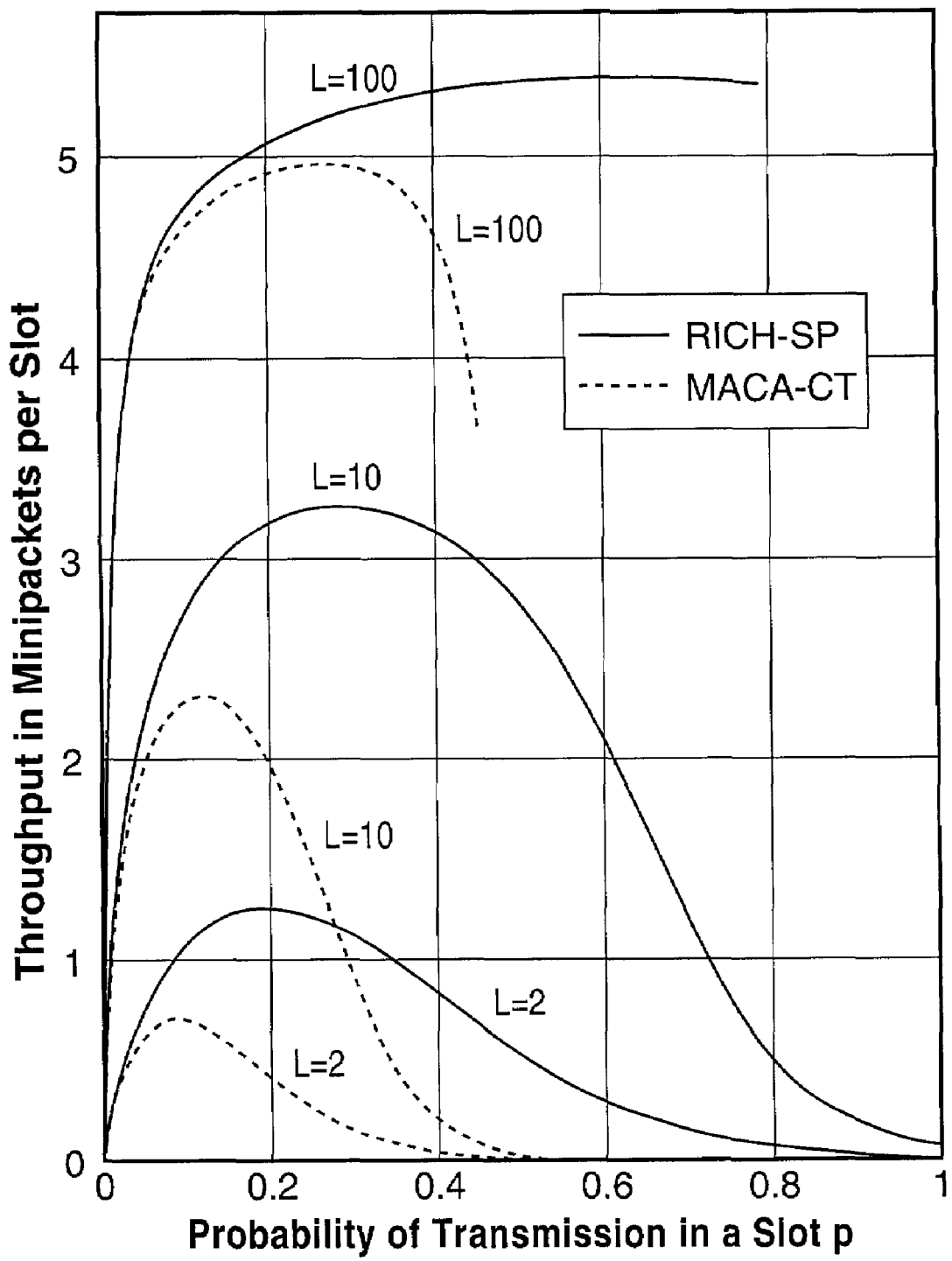
FIG. 9 is a graph of throughput and transmission probability in response to changing the number of network nodes for the RICH-SP protocol according to an embodiment of the present invention, shown compared with a conventional protocol.

FIG. 9 illustrates throughput in relation to the probability of transmission p for a fixed number of nodes (N=12) with the average packet length L being the parameter. RICH-SP, as anticipated, provides a higher throughput than MACA-CT regardless of the size of the data packet. It can be generally concluded for this case that RICH-SP provides higher throughput with a longer average packet length. It should, however, be appreciated that the assumption of a "perfect channel" has been made. In a realistic environment when the length of the transmitted packet is increased, the probability of errors increases accordingly. Furthermore, when the number of collocated nodes is high, the probability of interference from adjacent frequency channels increases which may introduce errors during the transmission of data packets. It is generally appreciated within the industry that significant throughput improvements achieved by simply increasing the length of the data packet are limited by the error threshold for a non-perfect "real-world" channel for other spread spectrum protocols, and the same limitation would be expected for the RICH protocols.

3.3. RICH-DP

The throughput analysis for RICH-DP differs from the one presented for RICH-SP in that the number i of pairs of nodes that become idle at any given time slot t, is dependent on the number of nodes that are exchanging only one data packet, as well as the number of nodes that are exchanging two data packets. The length of data transmitted is equal to a negative binomial distribution when two nodes exchange data packets at the same busy period, because all the nodes are independent sources of packets with identical geometrically distributed packet lengths. The probability that a data packet has length l is equal to $P[L=l]=(1-q)q^{l-1}$. If two data packets are to be sent, then the average length will be $$\bar{L} = \frac{2}{1-q}.$$

The parameter of the binomial distribution is denoted with q' when two packets are transmitted.

Figure 10:
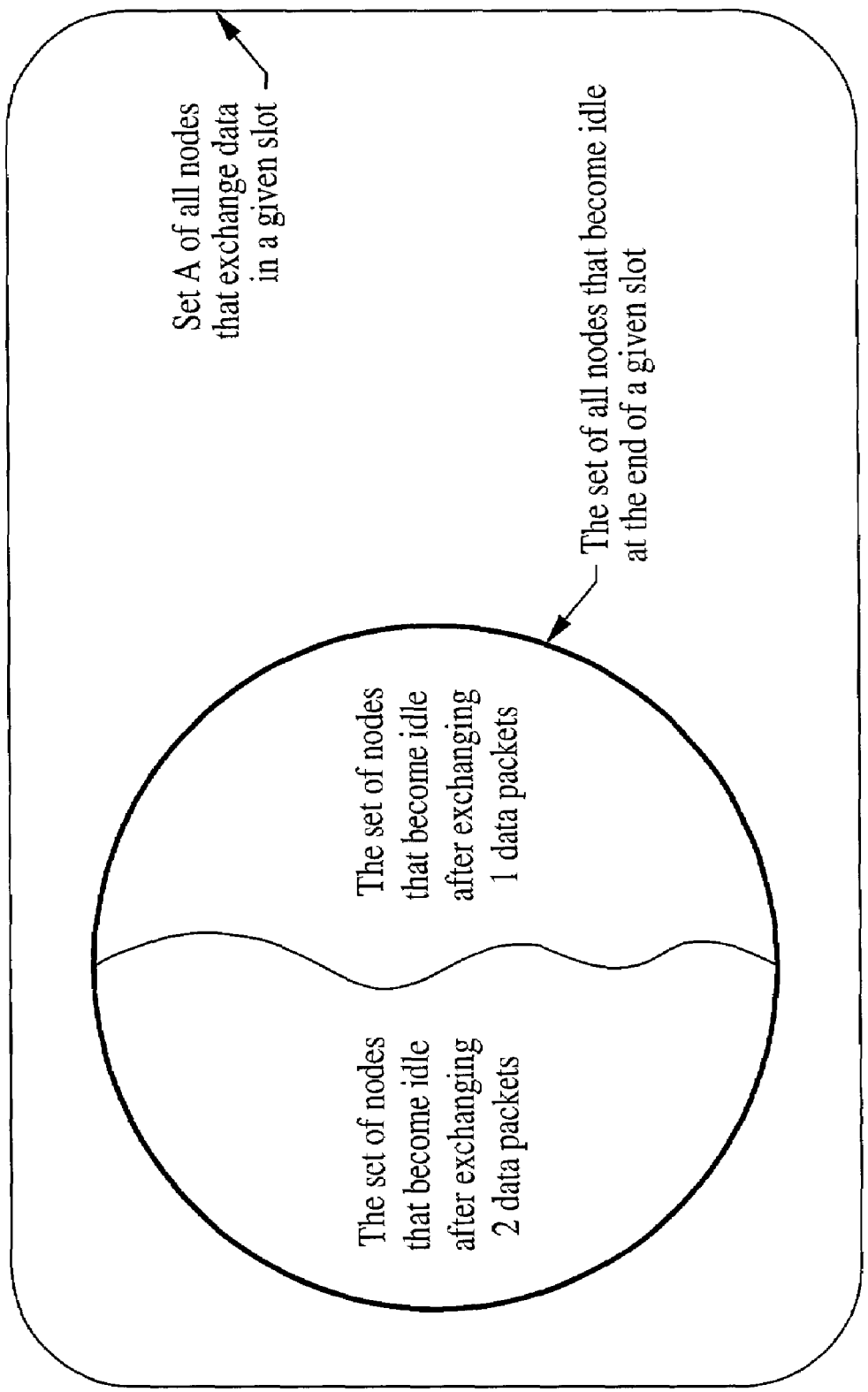
FIG. 10 is a state diagram showing the possible states of nodes as subsets within the set of all nodes exchanging data in a given time slot.

To calculate the probability that i pairs of nodes will become idle in a given time slot t, it is assumed that out of those i pairs that become idle, x are idle after exchanging only one data packet and the remaining i−x pairs are idle after exchanging two data packets. FIG. 10 shows the sets of nodes at the beginning of every time slot. Notice that, set A contains pairs of nodes that exchange only one data packet, as well as pairs of nodes which exchange two data packets. In view of the mutually exclusive events, the multinomial probability law may be utilized. If $B_1$, $B_2$, $B_3$, are the three partitions of the sample space, then let q be the probability that a pair of nodes becomes idle after exchanging one data packet, and let q' be the probability that a pair of nodes becomes idle after exchanging two data packets. It will be appreciated that:

$$P_T\begin{pmatrix} i \text{ pairs} \\ \text{become idle} \end{pmatrix} = \tag{6}$$

$$\frac{k!}{x!(i-x)!(k-i)!}\left(\frac{x}{i}q\right)^x\left(\frac{i-x}{i}q'\right)^{i-x}\left(1 - \frac{xq+(i-x)q'}{i}\right)^{k-i}$$

The transition probabilities for RICH-DP can be calculated in exactly the same way as in RICH-SP, wherein substituting Eq. 6 into Eq. 3 yields:

$$p_{k,l} = \sum_{x=0,k-l\neq\{0,-1\}}^{x=k-l+1}\left\{\frac{k!}{x!(k-l+1-x)!(l-1)!}\left(\frac{x}{k-l+1}q\right)^x \right. \tag{7}$$

$$\left(\frac{k-l+1-x}{k-l+1}q'\right)^{k-l+1-x}\left(1 - \frac{xq+(k-l+1-x)q'}{k-l+1}\right)^{l-1}$$

$$\left. B(N', p, 1)\frac{N'-1}{N-1}\right\} +$$

$$\sum_{x=0,k-l\neq\{0,-1\}}^{x=k-l}\left\{\frac{k!}{x!(k-l-x)!(l)!}\left(\frac{x}{k-l}q\right)\left(\frac{k-l-x}{k-l+1}q'\right)^{k-l-x}\right.$$

$$\left.\left(1 - \frac{xq+(k-l-x)q'}{k-l}\right)^{l-1}B(N'p, 1)\frac{N'-N}{N-1}\right\} +$$

$$\sum_{x=0,k-l\neq\{0,-1\}}^{x=k-l}\left\{\frac{k!}{x!(k-l-x)!(l)!}\left(\frac{x}{k-l}q\right)\left(\frac{k-l-x}{k-l+1}q'\right)^{k-l-x}\right.$$

$$\left.\left(1 - \frac{xq+(k-l-x)q'}{k-l}\right)^{l-1}(1 - B(N', p, 1)) - \right\}$$

Figure 11:
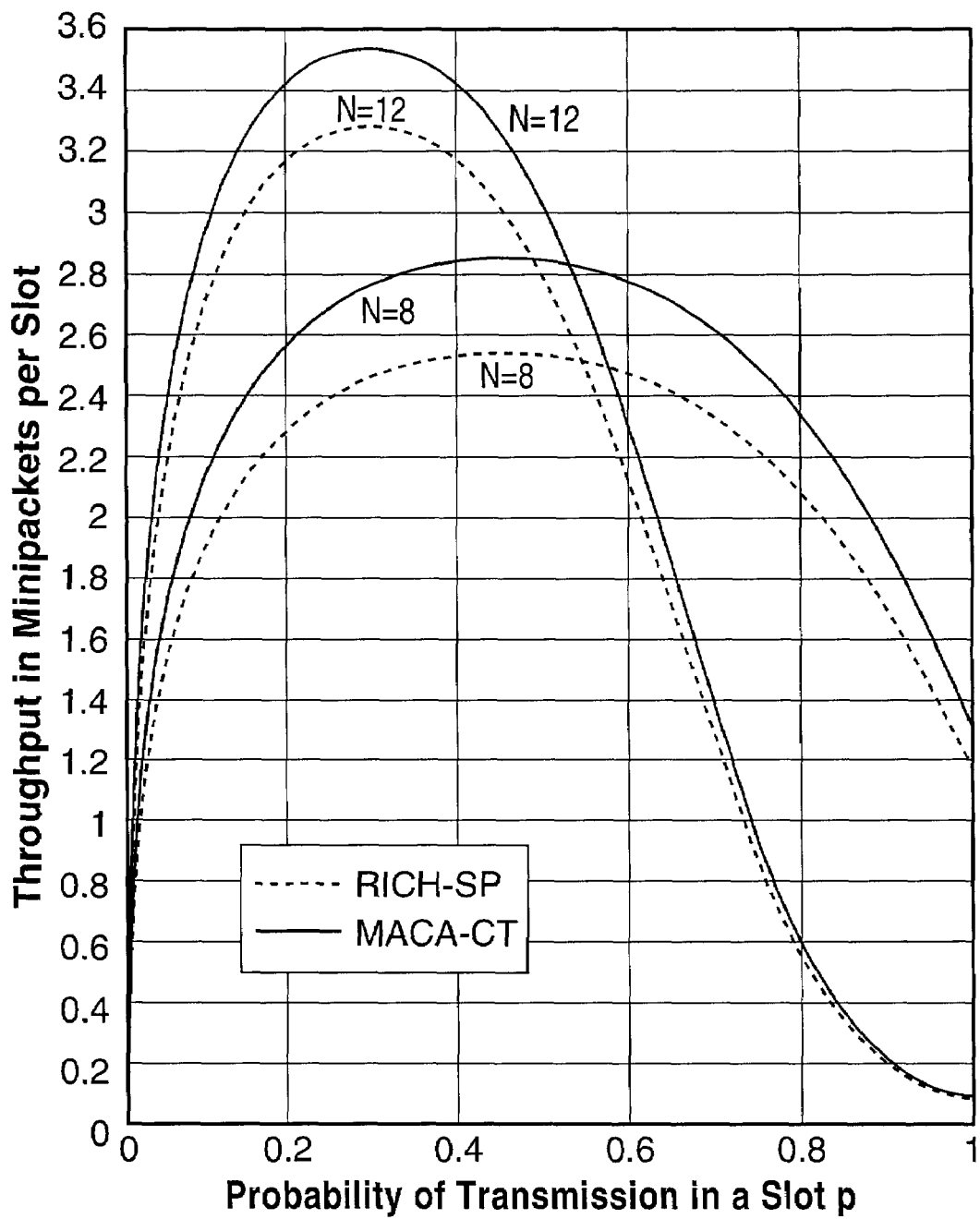
FIG. 11 is a graph of throughput and transmission probability in response to changing the number of network nodes for the RICH-SP and RICH-DP protocols according to embodiments of the present invention, shown in comparison with a conventional protocol.

The steady-state probabilities for RICH-DP can be calculated using the transition probabilities from Eq. 7. Throughput can then be derived using Eq. 5 with the steady-state probabilities for RICH-DP. FIG. 11 illustrates a substantial improvement in throughput obtained utilizing RICH-DP versus RICH-SP for the same average length of data packets.

4. Delay Analysis

In calculating the average delays for RICH protocols a retransmission policy first needs to be defined. It is assumed that the arrival process follows a Bernoulli relationship with probability p for every node. As a result of having a queue of maximum size equal to one packet, if a packet is waiting in the queue then there are no further new packet arrivals, and the waiting packet is retransmitted in the next slot with probability p. If a node has a packet waiting to be sent, but a packet from another user is received, then the waiting packet is discarded and upon completion of the handshake the given node becomes idle and generates a new packet with probability p.

Retaining the prior assumption, the average delay can be calculated utilizing the theorem of Little. The system delay is defined by D as the time that it takes for a new arriving packet that is waiting in the queue to be transmitted and successfully received by the intended receiver. If $\overline{m}$ is the average number of pairs of nodes that simultaneously exchange data packets, and $\overline{B}$ is the average number of blocked users such as due to collision or loss of RTS control packets, then at any given time the average number of packets in the system is equal to $\overline{m}+\overline{B}$, wherein the values for $\overline{m}$ and $\overline{B}$ can be calculated as follows:

$$\overline{m} = \sum_{m=0}^{[N/2]} mP_m \tag{8}$$

$$\overline{B} = \sum_{m=0}^{[N/2]} p(N-2m)\left(1 - \frac{N-m-1}{N-1}\right)P_m \tag{9}$$

The average delay normalized to a packet length is derived by applying the theorem of Little as follows:

$$\overline{D} = \frac{\overline{m}+\overline{B}}{S} \tag{10}$$

Since the mean transmission time for a packet is equal to $$\frac{1}{1-q}$$

the actual system delay should include the transmission time for the data packet, wherein:

$$D = \frac{\overline{D}}{(1-q)} \tag{11}$$

Figure 12:
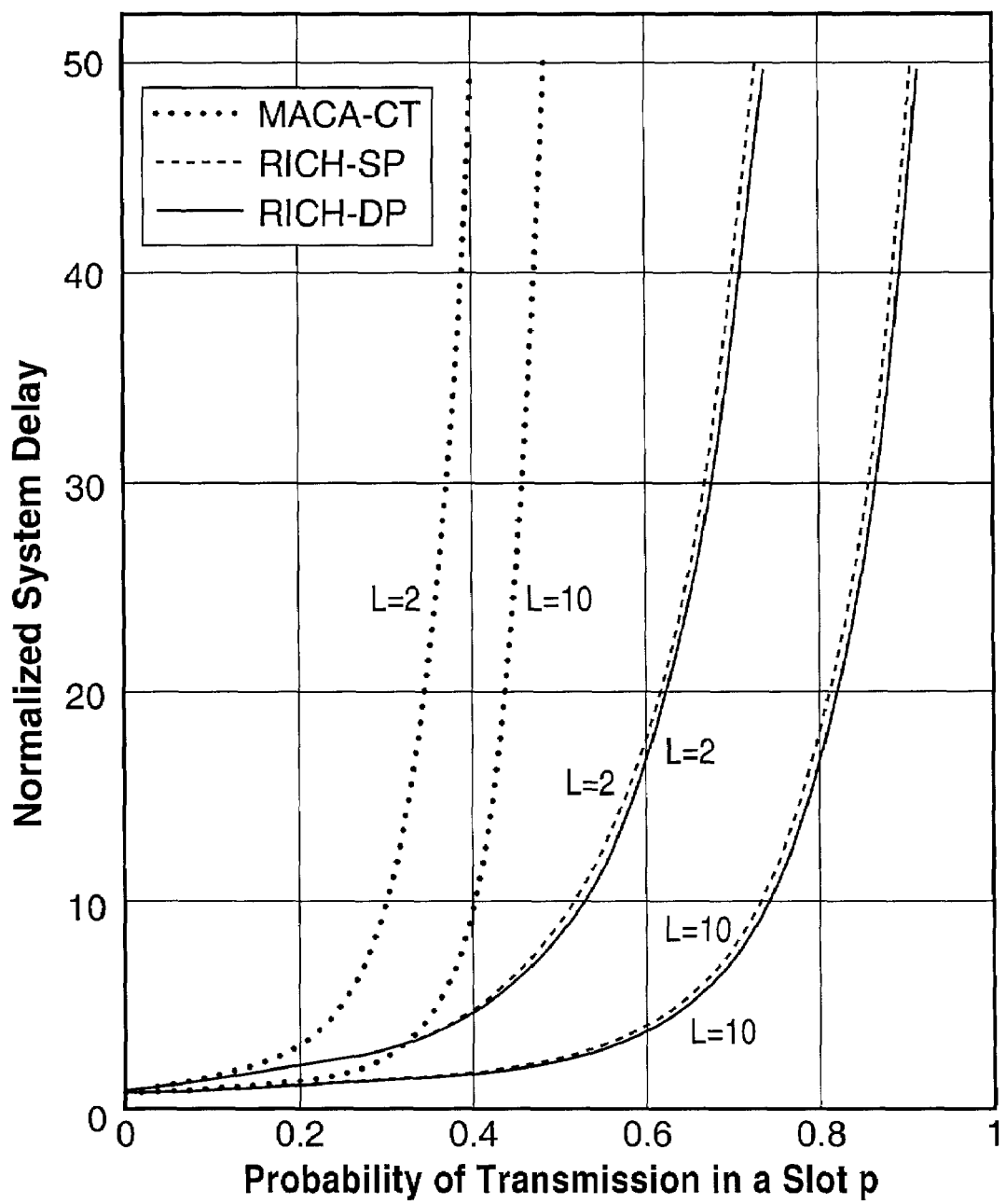
FIG. 12 is a graph of normalized system delay versus transmission probability for RICH-SP and RICH-DP according to an embodiment of the present invention, shown in comparison with a conventional MACA-CT protocol.
Figure 13:
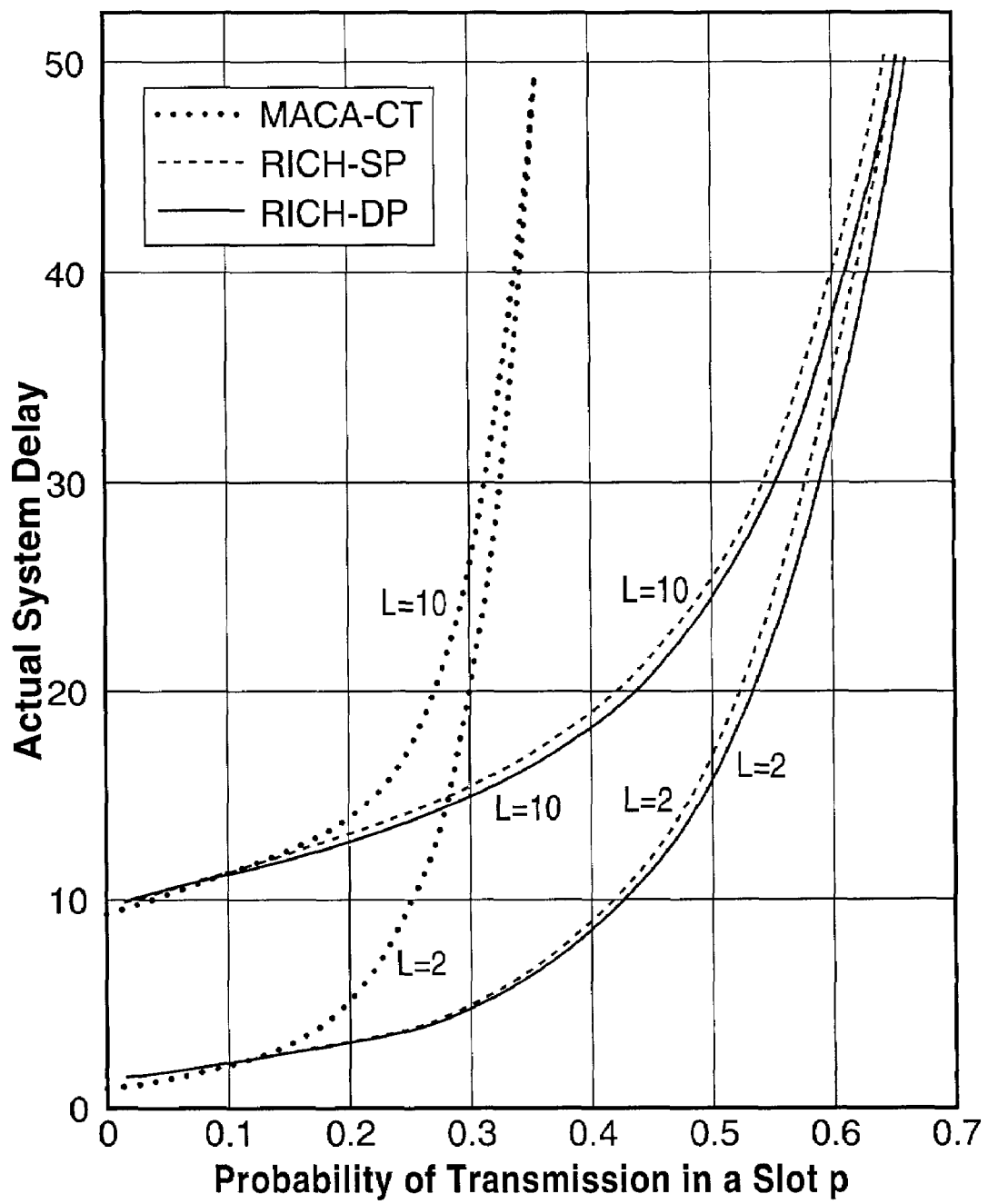
FIG. 13 is a graph of actual system delay versus transmission probability for RICH-SP and RICH-DP according to an embodiment of the present invention, shown in comparison with a conventional MACA-CT protocol.

In FIG. 12 the numerical results obtained for the normalized delay performance of MACA-CT, RICH-SP, and RICH-DP are depicted. It will be appreciated from the figure that RICH-DP provides the smallest delay at any load condition. Furthermore, the system delay utilizing RICH-SP and RICH-DP remains almost the same up to p>0.6 whereas with MACA-CT the delay increases exponentially when p>0.4. This is to be expected in response to the increasing occurrence of collisions between control packets as the offered load increases. It will be appreciated, therefore, that minimizing the length of the collision-avoidance handshakes that are susceptible to collisions becomes crucial. Indeed, with RICH-SP and RICH-DP, only RTR control packets can collide and therefore their vulnerability periods are half the vulnerability period in MACA-CT. In addition, RICH-DP always achieves lower delays than RICH-SP, since additional data may be sent per successful handshake. It is obvious from the same figure, that the normalized delay can be reduced noticeably by increasing the packet length.

In FIG. 11 the actual system delay that includes the packet transmission time is shown. In considering this figure it will be appreciated that smaller delays are not achieved by increasing the packet length, which is contrary to what occurred for normalized system delay. However, this result is to be expected since the transmission time is the dominating delay in this case.

5. Simulation Results

The analytical results were validated by performing a number of simulation experiments. The goal of these simulations was to investigate the performance of the RICH protocols under different network topologies and to show how the results compare against the analytical results presented previously. The OPNET simulation tool was utilized to implement MACA-CT, RICH-SP, and RICH-DP.

A radio capable of multiple-channel operation was considered within the simulation experiments to approximate a commercially available frequency hopping radio that operates over the 2.4 GHz ISM band. By using the external model access (EMA) capability of the OPNET simulation tool, a radio model was produced with seventy nine (79) frequency channels of bandwidth 1 MHz and maximum data rate of 1 Mbps. The simulated radio can either receive or transmit data on any channel, in view of the fact typical commercially available radios are half duplex. The simulation model for the physical layer was derived from the standard, high-fidelity, 13-pipeline stages model that is embedded in the simulation tool. To be compatible with the analysis, modifications were not included in the physical layer that would simulate delay or power capture phenomena.

Nodes are assumed to be approximately one mile away from each other, giving a maximum propagation delay of five microseconds (5 $\mu$S). An overhead of twenty four microseconds (24 $\mu$S) was incorporated to account for receive-to-transmit turn-around time, the necessary framing (preamble) bits, and guard-bands. The slot length was set equal to 120 microseconds in view of the size of an RTR control packet being set equal to 96 bits. When two control packets collide, they are considered to back-off for an amount of time that is exponentially distributed up to the size of a data packet. It should be appreciated that a number of different back-off strategies exist which can be applied to aid the performance of the RICH protocols without departing from the present invention. If a node fails to initiate a handshake after seven retransmissions, the data packet is dropped from the head of the queue.

Figure 14:
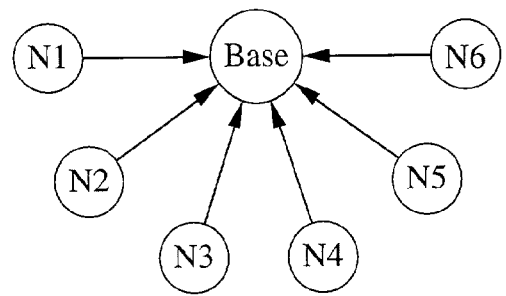
FIG. 14 is a network topology diagram utilized for simulating the operation of an embodiment of the present invention, showing a star-shaped topology of six nodes surrounding a base station.
Figure 15:
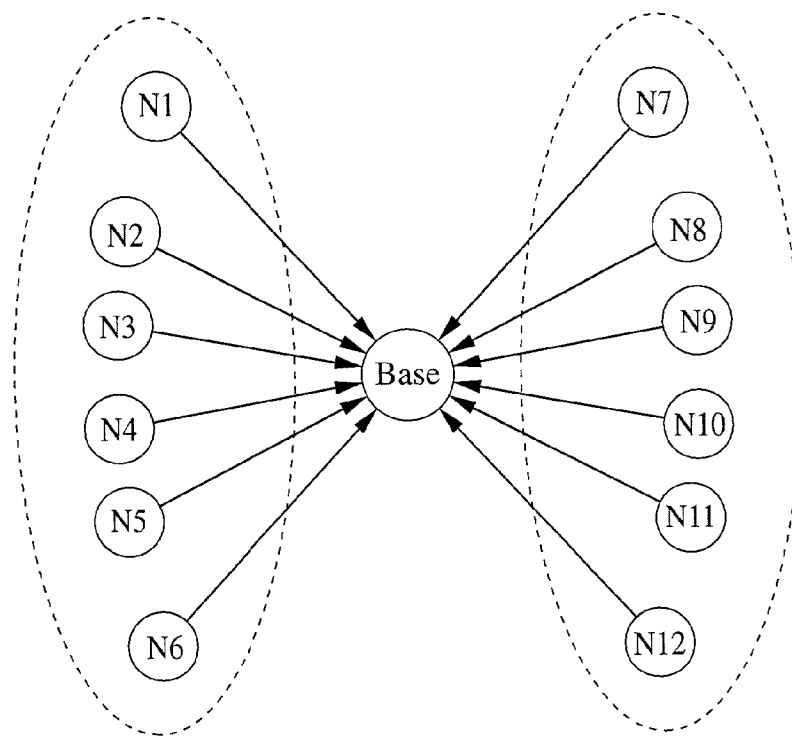
FIG. 15 is a network topology diagram utilized for simulating the operation of an embodiment of the present invention, showing a star-shaped topology having two groups, of six nodes each, which surround a base station.
Figure 16:
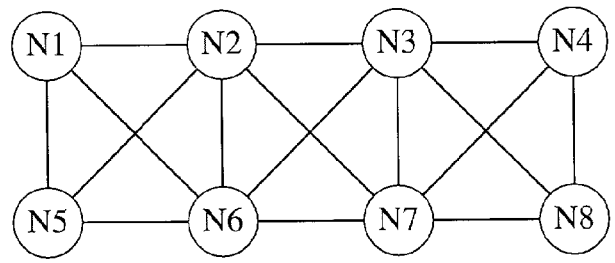
FIG. 16 is a network topology diagram utilized for simulating the operation of an embodiment of the present invention, showing a hyper-cube configuration of eight nodes.

FIG. 14 through FIG. 16 exemplify three topologies utilized within the experiments. FIG. 14 depicts a fully-connected network in which all the traffic produced from nodes N1 to N6 is directed to the base station, referred to as Base. FIG. 15 depicts two groups of five nodes that can hear each of the other nodes in the same group but are hidden from all the nodes in the other groups. Traffic is generated from all the nodes in each group, as before, with the destination being the central base station Base. In FIG. 16 a multihop network of eight nodes is depicted in a hypercube configuration with the lines between the nodes indicating the internode network connectivity. A node is generating traffic that three other nodes will receive at any given time whereas there are always at least two other nodes that are hidden. These topologies were chosen in view of their use within prior work on collision avoidance protocols which can provide comparative benchmarks for the present inventive methods.

Figure 17:
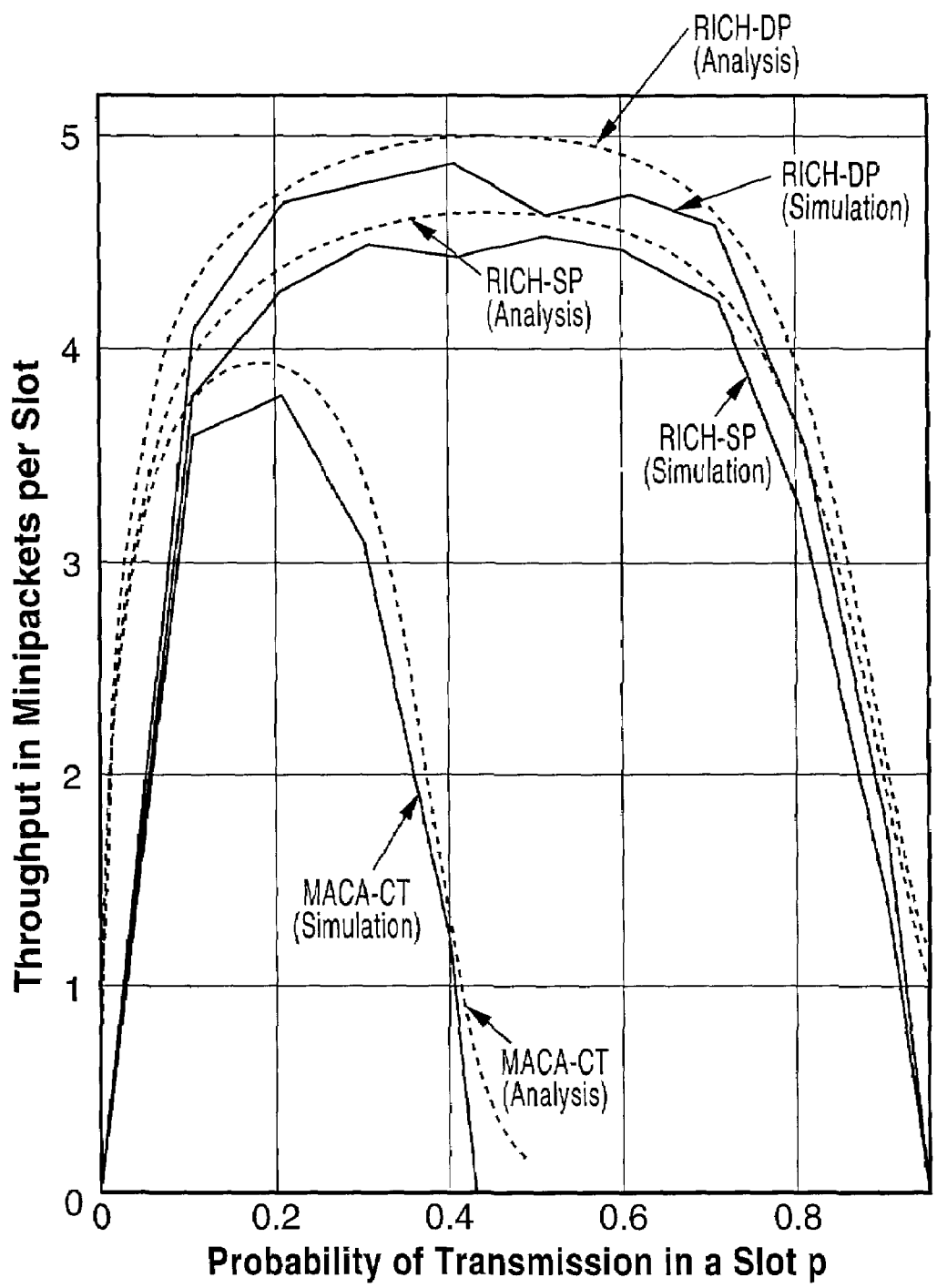
FIG. 17 is a graph of throughput by both analysis and simulations for a network of twelve nodes operating with RICH-SP and RICH-DP protocols according to embodiments of the present invention, shown compared with a conventional MACA-CT protocol.

Data packets are considered to be generated according to a Poisson distribution and the data packet size is assumed to be constant equal to five hundred bytes (500 bytes), which equals to approximately thirty four slots (34 slots such as L=34) of one hundred twenty bits (120 bits) each. FIG. 17 illustrates the throughput achieved with MACA-CT, RICH-SP, and RICH-DP versus the results found with analytical methods and described previously. The simulation results for this experiment were obtained from the topology of FIG. 15, and are substantially equivalent (within 10%) to the results obtained from the analysis. The slight differences were expected in view of the fact that the simulated radio model includes extra overhead bits to provide a more accurate representation of the physical effects that take place when a packet is sent or received, such as framing bits, padding bits, and so forth. It will be appreciated that the use of any other network topology should provide the same results since the analytical model utilized is applicable to fully-connected as well as multihop networks.

Figure 18:
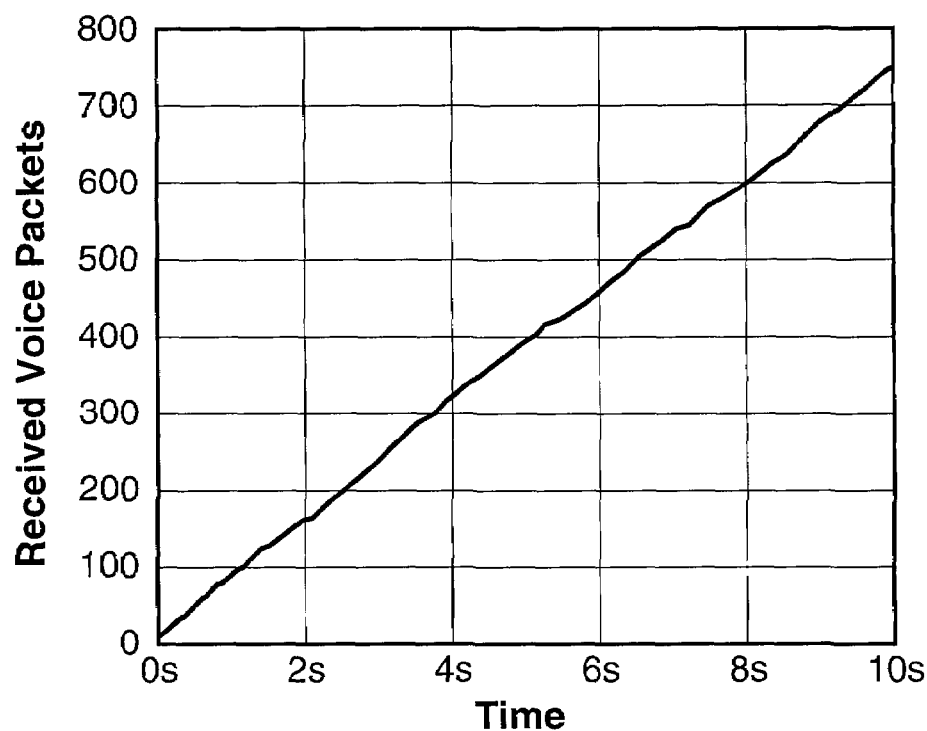
FIG. 18 is a graph of sent and received voice packets over a network with an aggregate node data rate which is lower than the available channel bandwidth according to a simulation of an embodiment of the present invention.
Figure 19:
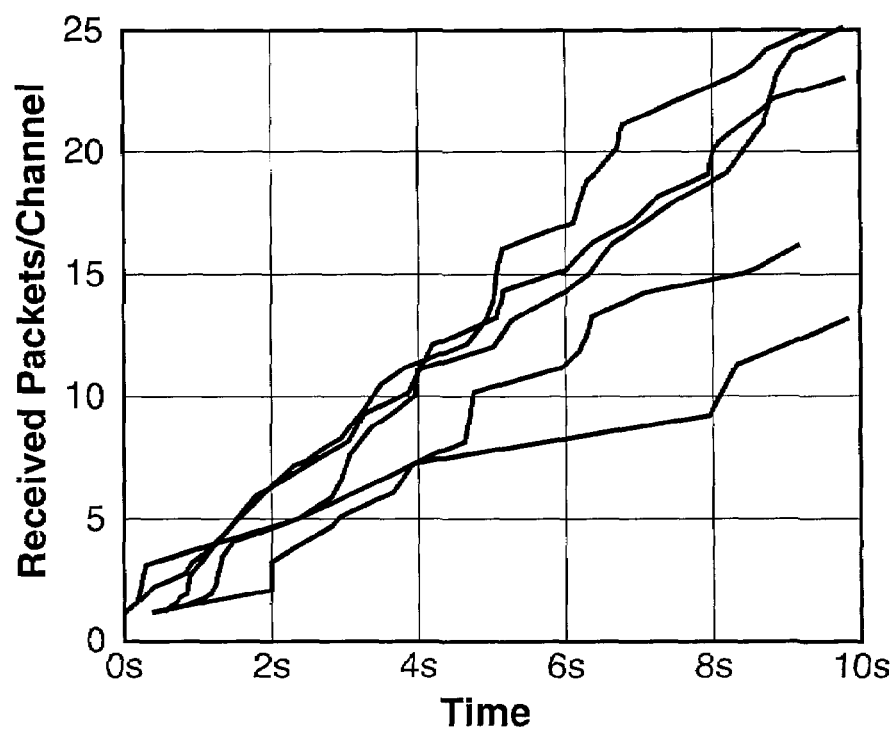
FIG. 19 is a graph of received packets per channel over the network with an aggregate node data rate which is lower than the available channel bandwidth according to a simulation of an embodiment of the present invention.
Figure 20:
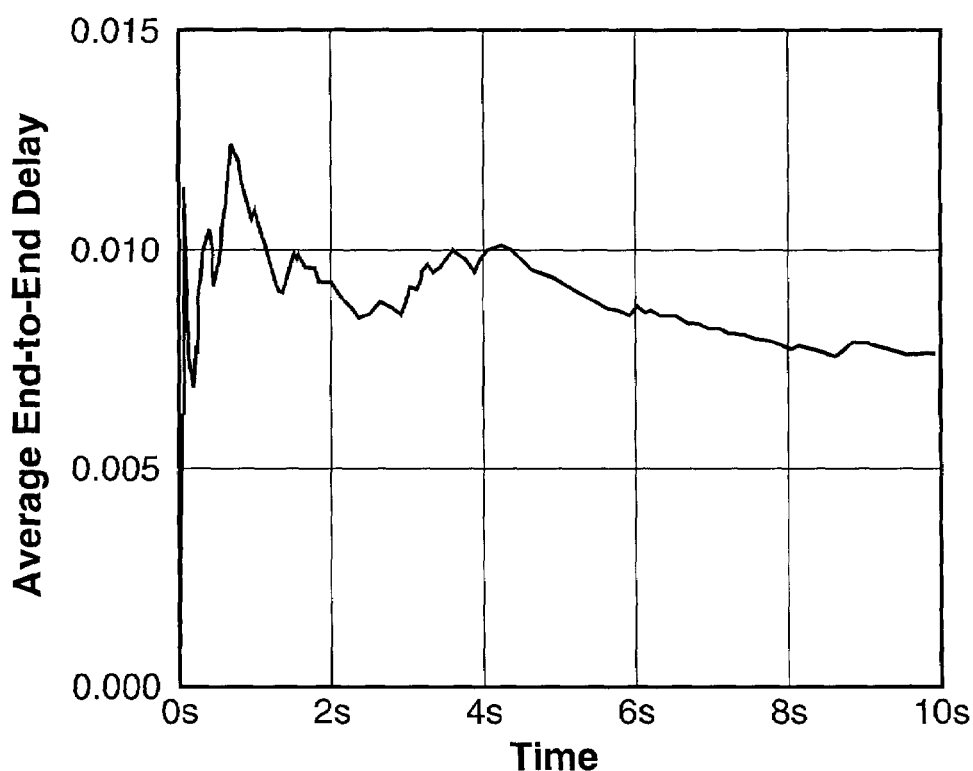
FIG. 20 is a graph of end-to-end delay for voice packets sent over the network with an aggregate node data rate which is lower than the available channel bandwidth according to a simulation of an embodiment of the present invention.
Figure 21:
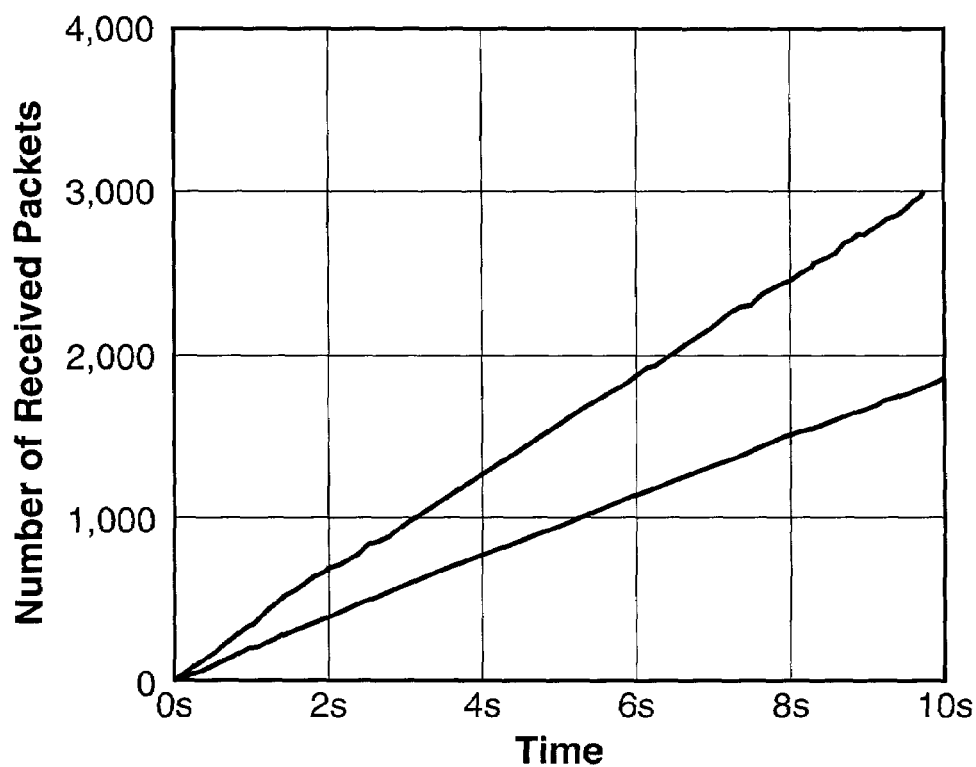
FIG. 21 is a graph of the number of sent and received packets sent over the network with an aggregate node data rate which is higher than the available channel bandwidth according to a simulation of an embodiment of the present invention.
Figure 22:
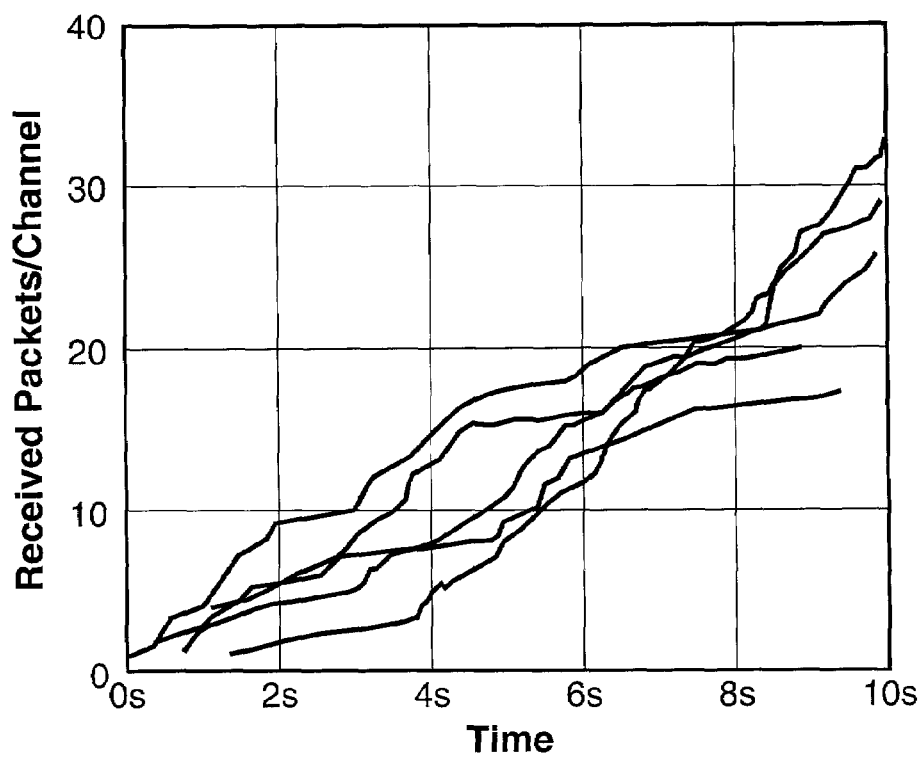
FIG. 22 is a graph of received packets per channel over the network with an aggregate node data rate which is higher than the available channel bandwidth according to a simulation of an embodiment of the present invention.
Figure 23:
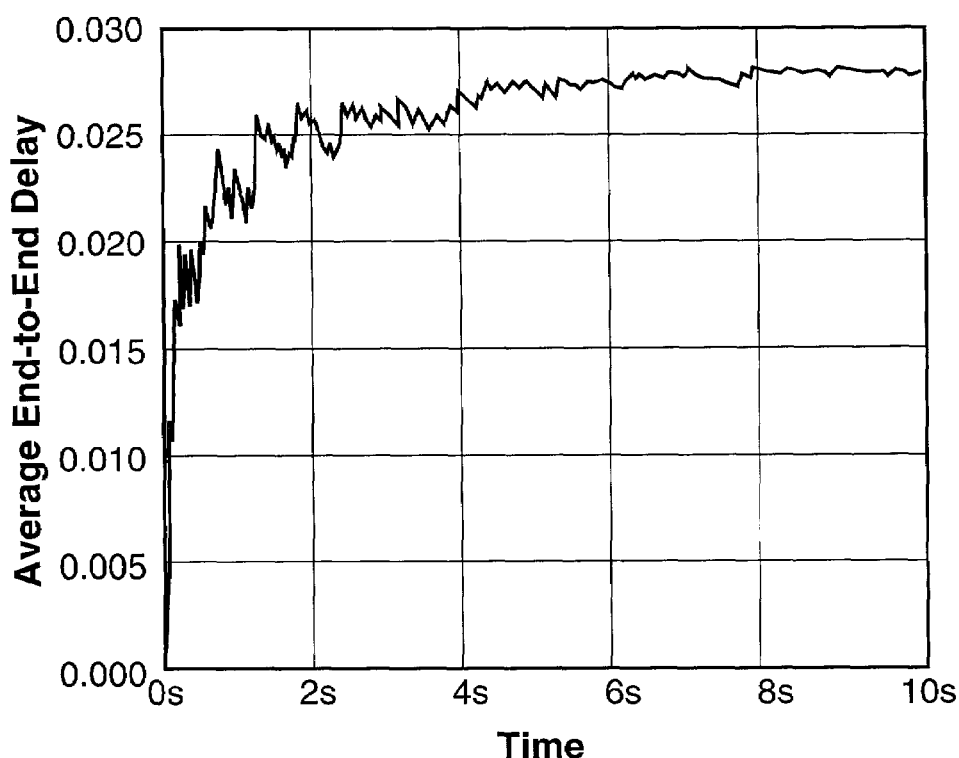
FIG. 23 is a graph of end-to-end delay for voice packets sent over the network with an aggregate node data rate which is higher than the available channel bandwidth according to a simulation of an embodiment of the present invention.

Using all three network topologies, a number of statistics were recorded to aid in understanding of the various effects that occur during operation of a commercially available frequency hopping radio. For example, when the nodes in the network produce packets of a data rate higher than the available channel bandwidth, the size of the packets waiting in the queue to be serviced grows rapidly. As can be seen in FIG. 18 through FIG. 25 for the network topology in FIG. 14, when the data rate is low, as depicted in FIG. 18 through FIG. 20 all the packets are received by the base station and the end-to-end medium access delay remains almost constant, such as shown in FIG. 20. However, when the data rate is higher than the capability of the radio, as shown in FIG. 21 through FIG. 23, the packets are lost after exceeding the available amount of retransmissions, and thereby average end-to-end delay increases rapidly as shown in FIG. 23. A collision resolution mechanism may be applied to the protocol to guarantee delay bounds for selected application types, such as voice. A number of examples of such mechanisms exist within industry literature.

Figure 24:
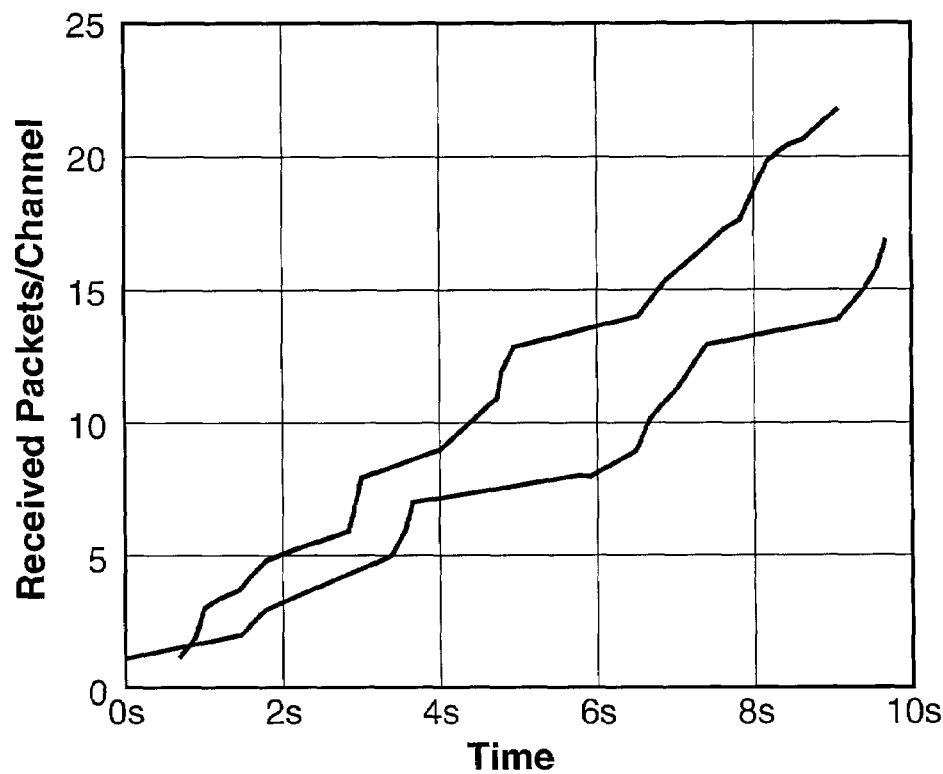
FIG. 24 is a graph of the difference in the received packets per channel between aggregate arrival rates which are above or below the available channel bandwidth according to an aspect of the present invention.
Figure 25:
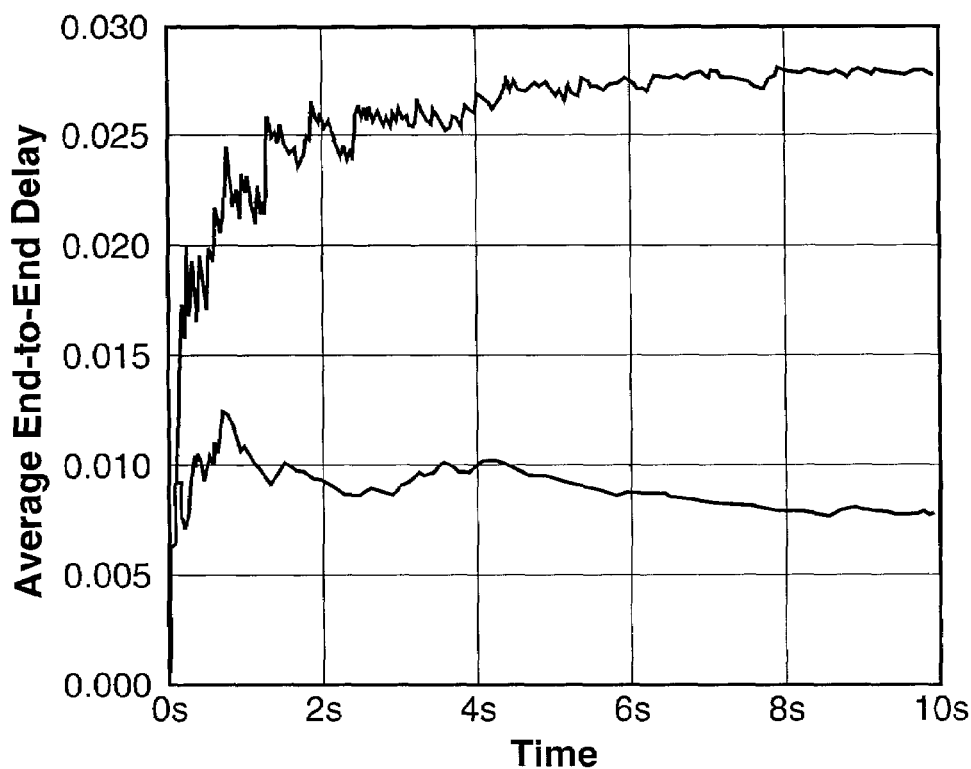
FIG. 25 is a graph of the difference in the average delay per channel between aggregate arrival rates which are above or below the available channel bandwidth according to an aspect of the present invention.

FIG. 24 and FIG. 25 illustrate the difference in responses based on aggregate arrival rate. FIG. 24 depicts the number of packets received per channel, wherein one curve plots the packets received for an aggregate arrival rate less than the bandwidth, while the other plot is for an aggregate arrival rate that exceeds the bandwidth. A similar comparison for average delay is depicted in FIG. 25.

Figure 26:
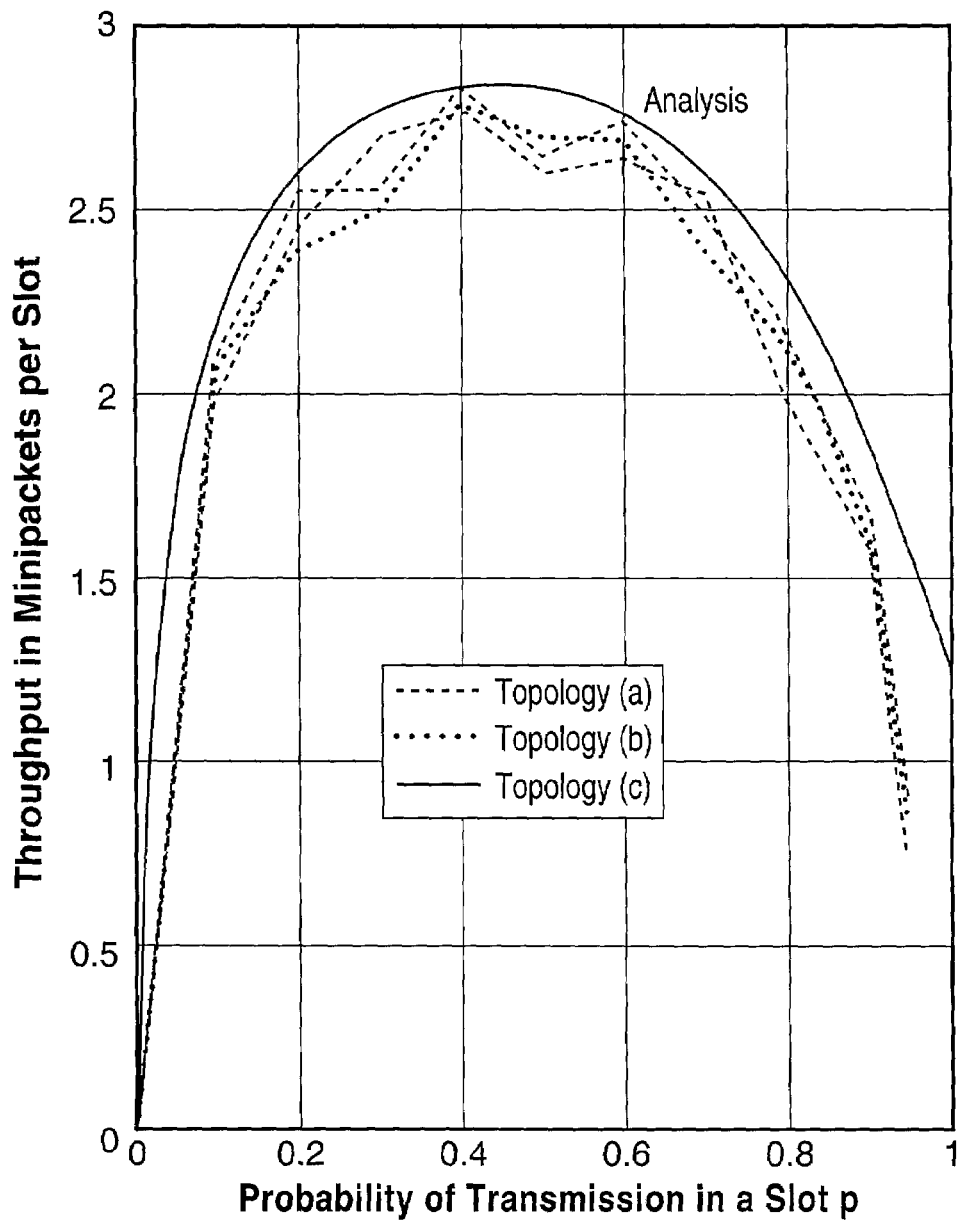
FIG. 26 is a graph of aggregate throughput and transmission probability for RICH-DP according to an aspect of the present invention, shown for eight nodes and an average packet length of ten.

To demonstrate that the performance of RICH protocols, such as RICH-DP, does not depend on network topology, simulation scenarios were developed with the same number of participating nodes. FIG. 26 illustrates the aggregate throughput of RICH-DP for the three topologies shown in FIG. 14 through FIG. 16, which have been slightly modified so that each of the three topologies would provide eight nodes sending packets, wherein two more nodes were added in FIG. 14, four nodes were deleted from FIG. 15, while FIG. 16 remained unchanged. In this case, an average data packet length of L=10 slots was utilized. It will be appreciated that the throughput of the network is fairly independent of the exact network topology. The two contributing factors to this effect are that any node in any of the networks has more available channels than neighbors which are competing for them, and that the RICH protocols provide correct collision avoidance in the presence of hidden terminals.

Accordingly, it will be seen that this invention provides a family of collision-avoidance protocols that correctly eliminate hidden-terminal interference without the need for carrier-sensing or the assignment of unique codes to network nodes, both of which are difficult to accomplish in ad-hoc networks based on commercial radios operating in ISM bands. It has been shown that RICH protocols eliminate hidden-terminal interference. The throughput of the RICH protocol has been compared with the MACA-CT protocol. For this comparison, the same analysis method as introduced by Sousa and Silvester for code-hopping protocols was utilized which illustrated that RICH-SP and RICH-DP achieve higher throughput than MACA-CT, without the need for any code assignments. Various simulation scenarios were developed to verify the analysis. It will be appreciated that the specific handshaking protocols, such as described by RTR and CTR control packets, may be alternately implemented by one of ordinary skill in the art without departing from the teachings of the present invention. Furthermore, additional mechanisms may be implemented to allow channels that have completed a handshake operation to transfer data without interfering with the common channel hopping sequence. It will be appreciated that a number of variations to the handshaking sequence and separating the hopping sequences may be considered by one of ordinary skill without inventive effort and therefore without departing from the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A multiple-channel medium access collision-avoidance protocol for execution by nodes of a network for the communication of data packets therebetween, comprising:
    adhering to a common channel-hopping sequence by each of said nodes;
    listening on channel hops within said common channel-hopping sequence when not transferring said data packets;
    engaging in a receiver-initiated handshake over a channel hop when data is available for sending;
    adhering to a new channel hopping sequence if the receiver-initiated handshake is successful;
    transferring data while adhering to said new channel-hopping sequence; and
    resynchronizing with the common channel hopping sequence at the completion of the data transfer.

2. The method as recited in claim 1, wherein to send data, nodes engage in a receiver-initiated dialogue over the channel-hop in which they find themselves at the time they acquire data to be sent.

3. The method as recited in claim 1, wherein nodes having a successful collision-avoidance handshake can remain in the same channel-hop for the duration of their data transfer, while the remaining nodes that are not subject to receiving or transmitting data continue to follow the common channel-hopping sequence.

4. The method as recited in claim 1, wherein a channel is selected from the group consisting essentially of a frequency hop, a spreading code, a combination of frequency hop and spreading code, and a hopping sequence.

5. The method as recited in claim 1, wherein a receiving node polls a sending node for data packets.

6. The method as recited in claim 1, wherein both a polling node and a polled node can transmit data after a successful handshake.

7. The method as recited in claim 1, wherein data packet collisions are eliminated without the need for carrier-sensing or code assignments.

8. The method as recited in claim 1
    wherein a clear-to-send (CTS) or equivalent control packet is transmitted by a polled node if no data has been received for transmission to a polling node; and
    wherein transmitting of data by said polling node may commence toward said polled node if available at said polling node.

9. The method as recited in claim 8, wherein said clear-to-send packet carries a value which specifies a base frequency of a destination hop.

10. The method as recited in claim 1
    wherein a ready-to-receive (RTR) or equivalent control packet is indicative of a polling node requesting to transmit data to a polled node; and
    wherein said polling node transmits data to said polled node subsequent to data receipt from said polled node and the sending of an acknowledgment to said polled node.

11. The method as recited in claim 10
    wherein transmitting of multiple RTR packets within a one-way propagation delay causes collision; and
    wherein upon detecting said collision, said nodes back off until a later time.

12. The method as recited in claim 11, wherein said later time for retrying the transmission of an RTR packet is determined based on a time interval which includes a random time component.

* * * * *